United States Patent
Zandi et al.

(10) Patent No.: US 10,126,321 B2
(45) Date of Patent: Nov. 13, 2018

(54) MICRO-OPTO-ELECTROMECHANICAL SYSTEMS (MOEMS) DEVICE

(71) Applicants: Kazem Zandi, Montreal (CA); Pierre Pottier, Montreal (CA)

(72) Inventors: Kazem Zandi, Montreal (CA); Pierre Pottier, Montreal (CA)

( * ) Notice: Subject to any disclaimer, the term of this patent is extended or adjusted under 35 U.S.C. 154(b) by 133 days.

(21) Appl. No.: 15/008,559

(22) Filed: Jan. 28, 2016

(65) Prior Publication Data

US 2016/0223329 A1 Aug. 4, 2016

Related U.S. Application Data

(60) Provisional application No. 62/110,272, filed on Jan. 30, 2015.

(51) Int. Cl.
*G01P 15/093* (2006.01)
*G01C 19/5755* (2012.01)
*G01P 15/18* (2013.01)

(52) U.S. Cl.
CPC ........ *G01P 15/093* (2013.01); *G01C 19/5755* (2013.01); *G01P 15/18* (2013.01)

(58) Field of Classification Search
CPC .......................... G01P 15/093; G01C 19/5705
USPC .......................................... 73/514.26, 514.27
See application file for complete search history.

(56) References Cited

U.S. PATENT DOCUMENTS

| | | | |
|---|---|---|---|
| 4,567,771 A * | 2/1986 | Nelson | G01P 15/093 250/231.1 |
| 6,175,108 B1 * | 1/2001 | Jones | G01P 15/093 250/227.14 |
| 7,555,173 B2 | 6/2009 | Barrios et al. | |
| 7,934,423 B2 | 5/2011 | Nasiri et al. | |
| 8,174,698 B2 | 5/2012 | Peter et al. | |
| 8,542,365 B2 * | 9/2013 | Pruessner | G01G 3/165 356/480 |
| 2004/0060355 A1 * | 4/2004 | Nemirovsky | G01P 15/093 73/504.14 |
| 2009/0153844 A1 | 6/2009 | Peter et al. | |

(Continued)

OTHER PUBLICATIONS

Zandi et al., Design and Demonstration of an In-Plane Silicon-on-Insulator Optical MEMS Fabry—Pérot-Based Accelerometer Integrated With Channel Waveguides, Journal of Microelectromechanical Systems, vol. 21, No. 6, Dec. 2012, pp. 1464-1470, Montreal, Canada.

(Continued)

*Primary Examiner* — John Chapman, Jr.
(74) *Attorney, Agent, or Firm* — BCF LLP

(57) ABSTRACT

A micro-opto-electromechanical systems (MOEMS) device is described. The device comprises at least one anchor on a chip; at least one spring connected to the anchor; at least one proof mass connected to the spring, the at least one proof mass being movable with respect to the chip; a movable optical element connected to the at least one proof mass; a first waveguide connected to the chip, the first waveguide being adapted for receiving light from a light source and a second waveguide connected to the chip, the second waveguide being adapted for operatively coupling to a photodetector and the movable optical element being disposed between the back end of the first waveguide and the front end of the second waveguide.

12 Claims, 14 Drawing Sheets

(56) References Cited

U.S. PATENT DOCUMENTS

2012/0050735 A1* 3/2012 Higgins .................. G01L 1/24
356/326
2015/0168441 A1 6/2015 Hutchison et al.

OTHER PUBLICATIONS

Pruessner et al., Integrated waveguide Fabry-Perot microcavities with silicon/air Bragg mirrors, Optics Letters, Mar. 1, 2007 / vol. 32, No. 5, pp. 533-535, Washington, USA.

Guldimann et al., Micromachined, Fiber-Optic Based Accelerometer with Shutter Modulation, Sensors, Actuators and Microsystems Laboratory, Institute of Microtechnology, pp. 710-714, University of Neuchatel, Neuchatel, Switzerland.

Marty et al., Fibre-optic accelerometer using silicon micromachining techniques, Elsevier, Sensors and Actuators A, 46-47, 1995, pp. 470-473.

Pruessner et al., Cryogenic etch process development for profile control of high aspect-ratio submicron silicon trenches, J. Vac. Sci. Technol. B 25(1), Jan./Feb. 2007, pp. 21-28, Washington, USA.

Venkatesh et al, Design and characterization of in-plane MEMS yaw rate sensor, Sadhana, vol. 34, Part 4, Aug. 2009, pp. 633-642, Bangalore, India.

Miao, Design, Fabrication, and Characterization of Microring Resonators used in Micro Gyroscopes, Copyright 2006, ProQuest Information and Learning Company, 86 pages.

Pruessner et al., In-plane microelectromechanical resonator with integrated Fabry-Pérot cavity, Applied Physics Letters 92, 081101-1-3, 2008, Washington, USA.

Zandi, Integrated Microphotonic-Mems Inertial Sensors, Universite de Montreal, Apr. 2013, Thesis, 214 pages, Montreal, Canada.

Barrios et al., Compact Silicon Tunable Fabry-Pérot Resonator With Low Power Consumption, IEEE Photonics Technology Letters, vol. 16, No. 2, Feb. 2004, pp. 506-508.

Pruessner et al., MEMS Chemical Sensors Using Waveguide Fabry-Perot Microcavities, IEEE 2008, 2 pages.

Guldimann, Micromachined fiber optic accelerometer based on intensity modulation, Dissertation Submitted to the faculty of Sciences of the University of Neuchâtel, in fulfillment of the requirements for the degree of "Docteur ès Sciences", Institute of Microtechnology, University of Neuchatel, Apr. 2001, 126 pages.

Schropfer et al., Lateral optical accelerometer micromachined in (100) silicon with remote readout based on coherence modulation, Elsevier, Sensors and Actuators A 68 (1998), pp. 344-349.

Pruessner et al., Thermo-optic tuning and switching in SOI waveguide Fabry-Perot microcavities, Optical Society of America, Jun. 11, 2007, vol. 15, No. 12, Optics Express 7557, 7 pages.

Pruessner et al., Tunable Fabry-Perot Waveguide Microcavities with High Index Contrast Mirrors, Optical Society of America, 2006, 2 pages.

Pruessner et al., Reconfigurable Filters Using MEMS Resonators and Integrated Optical Microcavities, Mems 2008, tucson, AZ, USA, Jan. 13-17, 2008 pp. 766-769.

* cited by examiner

MICRO-OPTO-ELECTROMECHANICAL SYSTEMS (MOEMS) DEVICE

CROSS-REFERENCE

The present application claims priority to U.S. Provisional Patent Application No. 62/110,272, filed on Jan. 30, 2015, the entirety of which is incorporated herein by reference.

FIELD

The present technology relates to the field of micro-opto-electro-mechanical systems (MOEMS) devices and MOEMS motion sensor devices.

BACKGROUND

Over the last decade, the development of small vehicles such as unmanned aerial vehicle (UAV), micro-robots, and micro-satellites compelled the providers to develop smaller, lighter, and lower power consumption components as these small vehicles are limited to mass, volume and power consumption. As a result, the attitude control system of these small vehicles is also needed to be miniaturized. For space-based systems, the major drivers are power, size, mass and reliability in the space environment. This is associated with an increasing necessity for compact, low-power inertial navigation systems. Current technologies consist of various sensors and processors that are not optimized to operate together. For example, optical sensing systems often operate on the principle of shifting wavelengths, necessitating the use of a laser illumination system and a complicated and expensive optical spectrum analyzer (OSA). This is costly and requires a considerable reduction of the mass and power resources available on a small system.

As such, there has developed a desire to obtain highly sensitive, low cost in-plane accelerometers and rotational rate sensors (gyroscopes) on a single substrate (chip) to enable the integration of an array of these sensors as three-axis sensor on a single platform, where the components have been optimized relative to their size, design, and fabrication process.

SUMMARY

It is an object of the present invention to ameliorate at least some of the inconveniences present in the prior art.

According to an aspect of the present technology, there is provided a micro-opto-electromechanical systems (MOEMS) device, comprising at least one anchor on a chip; at least one spring connected to the at least one anchor; at least one proof mass connected to the at least one spring, the at least one proof mass being movable with respect to the chip; a movable metallic mirror connected to the at least one proof mass; a first waveguide connected to the chip, the first waveguide being adapted for receiving light from a light source through a front end and delivering light through a back end; and a second waveguide connected to the chip, the second waveguide being adapted for receiving light from the first waveguide through a front end and delivering light through a back end, the second waveguide being adapted for operatively coupling to a photodetector, the first and second waveguides being integral to the chip, the movable metallic mirror being disposed between the back end of the first waveguide and the front end of the second waveguide.

In some implementations of the present technology, the MOEMS device is an accelerometer adapted for measuring an external acceleration applied to the chip.

In some implementations of the present technology, the MOEMS device is a gyroscope adapted for measuring rotational rate, the gyroscope further comprising at least one side plate connected to the at least one spring; and a comb drive connected to the chip, the comb drive operatively connected to the at least one proof mass through the at least one side plate, the comb drive providing driving oscillations to the at least one proof mass.

In some implementations of the present technology, the first and second waveguides are optical fibers.

In some implementations of the present technology, the metallic mirror is curved.

In some implementations of the present technology, the light source is a light-emitting diode (LED).

In some implementations of the present technology, the front end of the first waveguide is further adapted for operatively connecting to the photodetector.

According to another aspect of the present technology, there is provided a micro-opto-electromechanical systems (MOEMS) device, comprising at least one anchor on a chip; at least one spring connected to the at least one anchor; at least one proof mass connected to the at least one spring, the at least one proof mass being movable with respect to the chip; a movable optical element connected to the at least one proof mass; a first waveguide connected to the chip, the first waveguide being adapted for receiving light from a light source through a front end and delivering light through a back end; and a second waveguide connected to the chip, the second waveguide being adapted for receiving light from the first waveguide through a front end and delivering light through a back end, the second waveguide being adapted for operatively coupling to a photodetector; and at least one fixed optical element, the movable optical element and the at least one fixed optical element being disposed between the back end of the first waveguide and the front end of the second waveguide, the movable optical element and the at least one fixed optical element forming at least part of a deformable Bragg mirror.

In some implementations of the present technology, the movable optical element and the at least one fixed optical element further form at least part of a Fabry-Perot cavity.

In some implementations of the present technology, the MOEMS device is a gyroscope adapted for measuring rotational rate, the gyroscope further comprising at least one side plate connected to the at least one spring; and a comb drive connected to the chip, the comb drive operatively connected to the at least one proof mass through the at least one side plate, the comb drive providing driving oscillations to the at least one proof mass.

In some implementations of the present technology, the MOEMS device is an accelerometer adapted for measuring an external acceleration applied to the chip.

According to yet another aspect of the present technology, there is provided a micro-opto-electromechanical systems (MOEMS) device, comprising at least one anchor on a chip; at least one spring connected to the at least one anchor; at least one proof mass connected to the at least one spring, the at least one proof mass being movable with respect to the chip; a movable optical element connected to the at least one proof mass, the movable optical element being curved; a first waveguide connected to the chip, the first waveguide being adapted for receiving light from a light source through a front end and delivering light through a back end; and a second waveguide connected to the chip, the second waveguide being adapted for receiving light from the first waveguide through a front end and delivering light through a back end, the second waveguide being adapted for operatively coupling to a photodetector, the movable optical element being disposed between the back end of the first waveguide and the front end of the second waveguide.

In some implementations of the present technology, the first and second waveguides are integral to the chip.

In some implementations of the present technology, the MOEMS device is an accelerometer adapted for measuring an external acceleration applied to the chip.

In some implementations of the present technology, the MOEMS device is a gyroscope adapted for measuring rotational rate, the gyroscope further comprising at least one side plate connected to the at least one spring; and a comb drive connected to the chip, the comb drive operatively connected to the at least one proof mass through the at least one side plate, the comb drive providing driving oscillations to the at least one proof mass.

According to yet another aspect of the present technology, there is provided a micro-opto-electromechanical systems (MOEMS) device, comprising at least one anchor on a chip; at least one spring connected to the at least one anchor; at least one proof mass connected to the at least one spring, the at least one proof mass being movable with respect to the chip, the at least one proof mass being movable in a direction generally perpendicular to a plane of the chip; a movable reflective optical element connected to the at least one proof mass; a first waveguide connected to the chip, the first waveguide being adapted for receiving light from a light source through a front end and delivering light through a back end; and a second waveguide connected to the chip, the second waveguide being adapted for receiving light from the first waveguide through a front end and delivering light through a back end, the second waveguide being adapted for operatively coupling to a photodetector, the movable reflective optical element being disposed between the back end of the first waveguide and the front end of the second waveguide, the MOEMS device being adapted for measuring an externally applied acceleration in the direction generally perpendicular to the plane of the chip.

In some implementations of the present technology, the first and second waveguides are integral to the chip.

In some implementations of the present technology, the movable reflective optical element is a Bragg reflector.

In some implementations of the present technology, the first and second waveguides are optical fibers.

According to yet another aspect of the present technology, there is provided a micro-opto-electromechanical systems (MOEMS) device, comprising at least one anchor on a chip; at least one spring connected to the at least one anchor; at least one proof mass connected to the at least one spring, the at least one proof mass being movable with respect to the chip; a first movable optical element connected to a first side of the at least one proof mass; a second movable optical element connected to a second side of the at least one proof mass; a first waveguide connected to the chip, the first waveguide being adapted for receiving light from a light source through a first front end and delivering light through a first back end; a second waveguide connected to the chip, the second waveguide being adapted for receiving light from the first waveguide through a second front end and delivering light through a second back end, the second waveguide being adapted for operatively coupling to a first photodetector; a third waveguide connected to the chip, the third waveguide being adapted for receiving light from the light source through a third front end and delivering light through a third back end; and a fourth waveguide connected to the chip, the fourth waveguide being adapted for receiving light from the third waveguide through a fourth front end and delivering light through a fourth back end, the fourth waveguide being adapted for operatively coupling to a second photodetector, the first movable optical element being disposed between the first back end of the first waveguide and the second front end of the second waveguide, the second movable optical element being disposed between the third back end of the third waveguide and the fourth front end of the fourth waveguide, the first and second photodetectors being adapted for determining a difference in light amplitude exiting the second and fourth waveguides.

In some implementations of the present technology, the first and second movable optical elements form at least part of a variable optical attenuator.

In some implementations of the present technology, the first and second movable optical elements form at least part of a Fabry-Perot cavity.

In some implementations of the present technology, the first, second, third, and fourth waveguides are integral to the chip.

In some implementations of the present technology, the MOEMS device is an accelerometer adapted for measuring an external acceleration applied to the chip.

In some implementations of the present technology, the MOEMS device is a gyroscope adapted for measuring rotational rate, the gyroscope further comprising at least one side plate connected to the at least one spring; and a comb drive connected to the chip, the comb drive operatively connected to the at least one proof mass through the at least one side plate, the comb drive providing driving oscillations to the at least one proof mass.

According to yet another aspect of the present technology, there is provided a multi-axis MOEMS-based sensing device on a chip, comprising a plurality of micro-opto-electromechanical systems (MOEMS) devices, the plurality of MOEMS devices being oriented in a plurality of directions, each device of the plurality of MOEMS devices comprising at least one spring connected to the chip; at least one proof mass connected to the at least one spring, the at least one proof mass being movable with respect to the chip; a movable optical element connected to the at least one proof mass; a first waveguide connected to the chip, the first waveguide being adapted for receiving light from a light source through a front end and delivering light through a back end; and a second waveguide connected to the chip, the second waveguide being adapted for receiving light from the first waveguide through a front end and delivering light through a back end, the second waveguide being adapted for operatively coupling to a photodetector, the movable optical element being disposed between the back end of the first waveguide and the front end of the second waveguide, and for at least one device of the plurality of MOEMS devices, the movable optical element being curved.

In some implementations of the present technology, at least one MOEMS device of the plurality of MOEMS devices is an accelerometer adapted for measuring an external acceleration applied to the chip.

In some implementations of the present technology, at least one device of the plurality of MOEMS devices is a gyroscope adapted for measuring rotational rate, the gyroscope further comprising at least one side plate connected to the at least one spring; and a comb drive connected to the chip, the comb drive operatively connected to the at least one proof mass through the at least one side plate, the comb drive providing driving oscillations to the at least one proof mass.

In some implementations of the present technology, the device further comprises at least one other MOEMS device acting as a reference, the one other MOEMS device comprising a fixed optical element connected to the chip; a first waveguide connected to the chip, the first waveguide being adapted for receiving light from a light source through a front end and delivering light through a back end; and a second waveguide connected to the chip, the second waveguide being adapted for receiving light from the first waveguide through a front end and delivering light through a back end, the second waveguide being adapted for operatively coupling to a photodetector, the fixed optical element being disposed between the back end of the first waveguide and the front end of the second waveguide.

According to another aspect of the present technology, there is provided integrated optical accelerometer, operating on spectral properties of transmission or reflection through an optical cavity to measure an acceleration, comprising an optical part made of a tunable laser and photodetector connected by optical fibers and passing through a Fabry-Perot (FP) cavity made of a fixed reflective optical element and a movable reflective optical element, the movable reflective optical element being connected to at least one proof mass, and the proof mass(es)—if several, being mechanically connected together—and being attached to at least one anchor on the chip through at least one spring.

In some implementations of the present technology, at least one of the reflective optical elements is substantially made of or covered with gold or any highly reflective metal, possibly obtained by thin film deposition.

In some implementations of the present technology, there are two proof masses.

According to another aspect of the present technology, there is provided an integrated optical accelerometer, operating on amplitude properties of transmission or reflection through an optical cavity to measure an acceleration, comprising an optical part made of guiding elements, such as e.g. waveguides or optical fibers, connected to a FP cavity made of a fixed reflecting element and an adjustable Bragg mirror, this last made of a part of a Bragg mirror, fixed, and another part of the Bragg mirror, mobile; this mobile part being connected to at least one proof mass, and the proof mass(es)—if several, being mechanically connected together—and being attached to at least one anchor on the chip through at least one spring.

According to another aspect of the present technology, there is provided an integrated optical accelerometer, operating on amplitude properties of transmission or reflection through an optical shutter or variable optical attenuator to measure an acceleration, comprising an optical part made of a source of light and a photodetector connected by optical fibers and passing through a shutter made of a mobile Bragg mirror partially obstructing or reflecting the beam of light, the Bragg mirror being connected to at least one proof mass, and the proof mass(es)—if several, being mechanically connected together—and being attached to at least one anchor on the chip through at least one spring.

In some implementations of the present technology, the acceleration is measured using the displacement of a Bragg mirror attached to a proof mass.

In some implementations of the present technology, the acceleration is measured using the change of optical properties of a Bragg mirror shutter.

In some implementations of the present technology, the acceleration is measured using the amplitude change of transmitted light.

According to another aspect of the present technology, there is provided an integrated optical gyroscope, operating on amplitude properties of transmission or reflection through an optical cavity to measure an angular velocity, comprising an optical part made of waveguides connected to a FP cavity made of a fixed reflecting element and an adjustable Bragg mirror, this last made of a part of a Bragg mirror, fixed, and another part of the Bragg mirror, mobile; this mobile part being connected to at least one side plate, and the side plate(s) being attached to at least one anchor on the chip and to at least one proof mass, through at least one spring; the proof masses, if several, being mechanically connected together; and at least one side plate being driven by at least one comb drive to drive the proof mass(es).

In some implementations of the present technology, the reflecting element is substantially made of or covered with gold or any highly reflective metal, possibly obtained by thin film deposition.

According to another aspect of the present technology, there is provided an integrated optical gyroscope, operating on amplitude properties of transmission or reflection through an optical shutter or variable optical attenuator to measure an angular velocity, comprising an optical part made of optical fibers connected to a shutter made of a mobile element partially obstructing or reflecting the beam of light, the mobile element being connected to at least one side plate, and the side plate(s) being attached to at least one anchor on the chip and to at least one proof mass, through at least one spring; the proof masses, if several, being mechanically connected together; and at least one side plate being driven by at least one comb drive to drive the proof mass(es).

According to another aspect of the present technology, there is provided an integrated optical gyroscope, operating on spectral properties of transmission or reflection through an optical cavity to measure an angular velocity, comprising an optical part made of a tunable laser and photodetector connected by optical fibers and passing through a FP cavity made of a fixed reflective optical element and a movable reflective optical element, the movable reflective optical element being connected to at least one side plate, and the side plate(s) being attached to at least one anchor on the chip and to at least one proof mass, through at least one spring; the proof masses, if several, being mechanically connected together; and at least one side plate being driven by at least one comb drive to drive the proof mass(es).

In some implementations of the present technology, the Bragg mirror is made of three plates—a plate, or vertical wall, acting as a half-period of the Bragg mirror.

According to another aspect of the present technology, there is provided an integrated optical gyroscope, operating on amplitude properties of transmission or reflection through an optical cavity to measure an angular velocity, comprising an optical part made of a source of light of moderate bandwidth and a photodetector connected by optical fibers and passing through a FP cavity made of a fixed reflecting element and an adjustable Bragg mirror, this last made of a part of a Bragg mirror, fixed, and another part of the Bragg mirror, mobile; this mobile part being connected to at least one side plate, and the side plate(s) being attached to at least one anchor on the chip and to at least one proof mass, through at least one spring; the proof masses, if several, being mechanically connected together; and at least one side plate being driven by at least one comb drive to drive the proof mass(es).

In some implementations of the present technology, the adjustable Bragg mirror is made of a fixed part containing two plates—a plate, or vertical wall, acting as a half-period of the Bragg mirror—and a mobile part containing one plate, surrounded by the two plates of the fixed part.

In some implementations of the present technology, the fixed Bragg mirror is made of three plates—a plate, or vertical wall, acting as a half-period of the Bragg mirror.

According to another aspect of the present technology, there is provided an integrated optical accelerometer or gyroscope, operating on amplitude properties of reflection on a reflecting element after passing through an optical shutter or variable optical attenuator to measure an acceleration or an angular velocity, comprising an optical part made of a source of light, and a photodetector, connected by a guiding element, passing through a shutter made of a mobile element partially obstructing the beam of light, and reflected by a reflecting element, the mobile element being connected to at least one proof mass, and the proof mass(es)—if several, being mechanically connected together—and being attached to at least one anchor on the chip through at least one spring; and for a gyroscope, the mobile element being connected to at least one side plate, and the side plate(s) being attached to at least one anchor on the chip and to at least one proof mass, through at least one spring, with at least one side plate being driven by at least one comb drive to drive the proof mass(es).

In some implementations of the present technology, the mobile element is an absorber, or a Bragg mirror or metallic mirror diverting the light away from the input guiding element, e.g. at an angle.

According to another aspect of the present technology, there is provided an integrated optical accelerometer or gyroscope, operating on amplitude properties of transmission or reflection through an optical shutter or variable optical attenuator to measure an acceleration, or an angular velocity, comprising an optical part made of a source of light and a photodetector connected by optical fibers and passing through a shutter made of a mobile Bragg mirror with out-of-plane movement, partially obstructing or reflecting the beam of light, the mobile Bragg mirror being connected to at least one proof mass, and the proof mass(es)—if several, being mechanically connected together—and being attached to at least one anchor on the chip through at least one spring; and for a gyroscope, the mobile Bragg mirror being connected to at least one side plate, and the side plate(s) being attached to at least one anchor on the chip and to at least one proof mass, through at least one spring, with at least one side plate being driven by at least one comb drive to drive the proof mass(es).

According to another aspect of the present technology, there is provided an integrated optical accelerometer or gyroscope, operating on amplitude properties of transmission or reflection through an optical shutter or variable optical attenuator to measure an acceleration, or an angular velocity, comprising an optical part made of a source of light and a photodetector connected by waveguides and passing through a shutter made of a mobile element with out-of-plane movement, partially obstructing or reflecting the beam of light, the mobile element being connected to at least one proof mass, and the proof mass(es)—if several, being mechanically connected together—and being attached to at least one anchor on the chip through at least one spring; and for a gyroscope, the mobile element being connected to at least one side plate, and the side plate(s) being attached to at least one anchor on the chip and to at least one proof mass, through at least one spring, with at least one side plate being driven by at least one comb drive to drive the proof mass(es).

In some implementations of the present technology, the acceleration is measured using the displacement of the mobile element attached to the proof mass.

In some implementations of the present technology, the acceleration is measured using the change of optical properties of the mobile element shutter.

In some implementations of the present technology, the acceleration is measured using the amplitude change of transmitted light.

According to another aspect of the present technology, there is provided an integrated optical accelerometer, operating on either: spectral properties of transmission or reflection through an optical cavity, amplitude properties of transmission or reflection through an optical cavity, or amplitude properties of transmission or reflection through an optical shutter or variable optical attenuator, to measure two or three accelerations, and comprising one or two optical parts along perpendicular directions and one or no optical part operating in out-of-plane motion, and made of guiding elements connected to either: a FP cavity made of a fixed reflecting optical element and a mobile reflecting optical element, a FP cavity made of a fixed reflecting element and an adjustable Bragg mirror, this last made of a part of a Bragg mirror, fixed, and another part of the Bragg mirror, mobile, or a shutter made of a mobile element partially obstructing or reflecting the beam of light; the mobile elements being connected together to at least one proof mass, and the proof mass(es)—if several, being mechanically connected together—and being attached to at least one anchor on the chip through at least one spring.

In some implementations of the present technology, the fixed and/or mobile element is substantially made of or covered with gold or any highly reflective metal, possibly obtained by thin film deposition.

According to another aspect of the present technology, there is provided an integrated optical accelerometer, operating on either: spectral properties of transmission or reflection through an optical cavity, amplitude properties of transmission or reflection through an optical cavity, or amplitude properties of transmission or reflection through an optical shutter or variable optical attenuator, in a differential measurement, to measure an acceleration, and comprising at least a pair of optical parts made of waveguides connected to either: a FP cavity made of a fixed reflecting optical element and a mobile reflecting optical element, a FP cavity made of a fixed reflecting element and an adjustable Bragg mirror, this last made of a part of a Bragg mirror, fixed, and another part of the Bragg mirror, mobile, or a shutter made of a mobile element partially obstructing or reflecting the beam of light; the mobile element being connected to at least one proof mass, and the proof mass(es)—if several, being mechanically connected together—and being attached to at least one anchor on the chip through at least one spring.

According to another aspect of the present technology, there is provided an integrated optical gyroscope, operating on either: spectral properties of transmission or reflection through an optical cavity, amplitude properties of transmission or reflection through an optical cavity, or amplitude properties of transmission or reflection through an optical shutter or variable optical attenuator, in a differential measurement, to measure an angular velocity, and comprising at least a pair of optical parts made of guiding elements connected to either: a FP cavity made of a fixed reflecting optical element and a mobile reflecting optical element, a FP cavity made of a fixed reflecting element and an adjustable Bragg mirror, this last made of a part of a Bragg mirror, fixed, and another part of the Bragg mirror, mobile, or a shutter made of a mobile element partially obstructing or reflecting the beam of light; the mobile element being connected to at least one side plate, and the side plate(s) being attached to at least one anchor on the chip and to at least one proof mass, through at least one spring, the proof masses, if several, being mechanically connected together, and at least one side plate being driven by at least one comb drive to drive the proof mass(es).

In some implementations of the present technology, one comb drive is used for the actuation of at least one proof mass.

In some implementations of the present technology, two comb drives are used for the actuation of at least one proof mass, the comb drives working in a push-pull configuration.

In some implementations of the present technology, there is one proof mass.

In some implementations of the present technology, a proof mass is attached by four springs.

In some implementations of the present technology, a proof mass is perforated by an array of holes, in order to enable its release during the under-etching.

In some implementations of the present technology, a proof mass is damped, e.g. using thin walls of air between its structure and the fixed parts.

In some implementations of the present technology, the fixed Bragg mirror is made of three plates—a plate, or vertical wall, acting as a half-period of the Bragg mirror.

In some implementations of the present technology, the adjustable Bragg mirror is made of a fixed part containing two plates—a plate, or vertical wall, acting as a half-period of the Bragg mirror—and a mobile part containing one plate, surrounded by the two plates of the fixed part.

In some implementations of the present technology, the mobile Bragg mirror is made of three plates—a plate, or vertical wall, acting as a half-period of the Bragg mirror.

In some implementations of the present technology, the space between and around the plates—a plate, or vertical wall, acting as a half-period of the Bragg mirror, or as a shutter—and inside the cavity where required, is filled with any of: vacuum, air, gas, or liquid.

In some implementations of the present technology, the acceleration or the angular velocity, as appropriate, is measured using the displacement of an element attached to a proof mass.

In some implementations of the present technology, the acceleration is measured using the change of optical properties of an optical FP cavity.

In some implementations of the present technology, the acceleration is measured using the change of optical properties of a shutter.

In some implementations of the present technology, the acceleration is measured using the spectral shift of a resonance transmission peak.

In some implementations of the present technology, the acceleration is measured using the amplitude change of a resonance transmission peak.

In some implementations of the present technology, the acceleration is measured using the amplitude change of transmission.

In some implementations of the present technology, the source of light is a tunable laser.

In some implementations of the present technology, the source of light is of moderate bandwidth, in particular one which substantially covers the extents of the FP resonance transmission peak(s) but does not substantially exceed the stopband of the Bragg mirror(s).

In some implementations of the present technology, the source of light is of moderate bandwidth, in particular one which substantially does not exceed the stopband of the Bragg mirror(s).

In some implementations of the present technology, the source of light is an LED.

In some implementations of the present technology, the source of light is a broadband light, such as a white light or a light covering substantially the near-infrared region.

In some implementations of the present technology, the source of light is a laser.

In some implementations of the present technology, the photodetector bandwidth is limited substantially to the stopband of the Bragg mirror(s).

In some implementations of the present technology, the photodetector is a photodiode.

In some implementations of the present technology, the wavelength range of operation is in the near-infrared region.

In some implementations of the present technology, at least one guiding element is an optical fiber.

In some implementations of the present technology, at least one guiding element is a waveguide.

In some implementations of the present technology, at least one guiding element is a rib or ridge waveguide.

In some implementations of the present technology, at least one guiding element is a strip or channel waveguide.

In some implementations of the present technology, the ensemble of: proof mass with its springs, side plates, and anchors, is symmetrical.

In some implementations of the present technology, the waveguides are substantially made of silicon.

In some implementations of the present technology, the waveguides are etched through a silicon layer of a silicon-on-insulator substrate.

In some implementations of the present technology, at least a part of the constituting elements, such as e.g. waveguides or substrate, are made using III-V compound semiconductors, notably InGaAsP.

In some implementations of the present technology, the waveguides are substantially thick, around one or few tens of μm of thickness.

In some implementations of the present technology, the waveguides are substantially wide, around one or few tens of μm of width.

In some implementations of the present technology, the required elements, being e.g. either a proof mass, a spring, an anchor, a side plate, a vertical plate or wall, a Bragg mirror, or a comb drive, are realized together in one step of etching followed by under-etching.

In some implementations of the present technology, the reflective element(s), being e.g. a Bragg mirror or a metallic mirror, is curved, e.g. with a circular curvature.

In some implementations of the present technology, the reflective elements constituting a FP cavity are curved towards the cavity, i.e. are concave elements, in order to, e.g., either reduce the divergence of the beam, focalize it, or increase the quality factor of the cavity.

In some implementations of the present technology, the reflective element(s) is curved towards the input guiding element, i.e. is a concave element, in order to, e.g., either get a better beam divergence control, a better focalization, or increase the amount of light reflected into the guiding element.

In some implementations of the present technology, the acceleration or the angular velocity, as appropriate, is measured by detecting the transmitted light or by using the transmitted light properties, being e.g. a spectrum or an amplitude.

In some implementations of the present technology, the acceleration or the angular velocity, as appropriate, is measured by detecting the reflected light or by using the reflected light properties, being e.g. a spectrum or an amplitude.

In some implementations of the present technology, the acceleration or the angular velocity, as appropriate, is measured by detecting the transmitted light or by using the transmitted light properties, being e.g. a spectrum or an amplitude, and by detecting the reflected light or by using the reflected light properties, being e.g. a spectrum or an amplitude.

In some implementations of the present technology, only the input guiding element, being e.g. an optical fiber or a waveguide, is present.

In some implementations of the present technology, the output guiding element, being e.g. an optical fiber or a waveguide, is removed.

In some implementations of the present technology, an optical splitter is used to separate the guided light into two or more beams.

In some implementations of the present technology, at least one U-groove is etched, possibly accompanied by at least one lateral spring made of a vertical wall, in order to accommodate at least one optical fiber, close to the optical sensing part.

In some implementations of the present technology, at least one V-groove is made, in order to accommodate at least one optical fiber, close to the optical sensing part.

In some implementations of the present technology, the mobile element faces are perpendicular to the sensing direction, such as e.g. for a Bragg mirror or Bragg mirror part, or parallel to, such as e.g. for a shutter, which has for effect to decouple perpendicular directions for sensing.

In some implementations of the present technology, a proof mass is obtained, at least in part, using backside etching.

In some implementations of the present technology, the optical layer is thin and can accommodate silicon photonics devices, in particular using slab or channel waveguide monomode propagation.

In some implementations of the present technology, the optical layer is relatively thin and is also used electronically to host microelectronics components or circuits, such as e.g. CMOS, in particular to interface with or drive the optical and MEMS components.

In some implementations of the present technology, an optical fiber is bonded to the chip using glue, e.g. UV curing glue, the backside etching preventing the glue from reaching the MEMS or the optical sensing part by flowing.

According to another aspect of the present technology, there is provided an integrated optical multiple motion sensor, comprising at least two optical motion sensors, such as optical accelerometers or gyroscopes, including at least one optical accelerometer or gyroscope, on a same chip, and providing multi-axes motion sensing.

In some implementations of the present technology, the light is distributed into the different accelerometers or gyroscopes using waveguides and splitters.

In some implementations of the present technology, a six degrees of freedom motion sensor is provided.

In some implementations of the present technology, several inputs or waveguides with several sources of light, such as a tunable laser, a moderate bandwidth light, a broadband light, or a laser, are used to perform several sorts of measurements together, such as transmission or reflection through an optical cavity or a shutter, in amplitude or spectrally.

In some implementations of the present technology, multiple wavelengths or bands of wavelengths are used to address separately or at the same time the different accelerometers or gyroscopes.

In some implementations of the present technology, the multiple wavelengths or bands of wavelengths are sent through one guiding element, such as an optical fiber or a waveguide.

In some implementations of the present technology, the multiple wavelengths or bands of wavelengths are collected through one guiding element, such as an optical fiber or a waveguide.

In some implementations of the present technology, the multiple wavelengths or bands of wavelengths are sent and collected through one same guiding element, such as an optical fiber or a waveguide; each optical part of the accelerometers or gyroscopes possibly working in reflection or in transmission.

In some implementations of the present technology, different motions are post-decoupled by signal processing.

In some implementations of the present technology, different motions are post-decoupled by subtracting from a coupled motion sensor the value obtained with a decoupled motion sensor.

In some implementations of the present technology, providing a receptacle for optical fiber placement, such as a groove with lateral spring(s), comprises providing first an etch of the optical guiding layer through a predefined mask; then removing locally the barrier layer; pursuing etching the pattern provided by the mask into the top of the substrate; and finally providing a last etching step continuing into the same substrate, during which the other elements—springs, waveguides, optical elements, and top part of the proof mass—are etched in the optical guiding layer.

In some implementations of the present technology, providing a receptacle for optical fiber placement comprises providing a controlled depth to accommodate the optical fiber and align its core to the waveguide etched in the optical guiding layer.

In some implementations of the present technology, providing said elements comprises providing the local removing of the barrier layer, as required.

In some implementations of the present technology, the optical MEMS is used as an integrated optical accelerometer or gyroscope, or as part of an integrated optical multiple motion sensor.

In some implementations of the present technology, at least one of the reflective optical elements is a Bragg mirror.

In some implementations of the present technology, the reflective optical element is, or is covered with, a metallic mirror.

In some implementations of the present technology, the metallic mirror is obtained by thin film deposition.

In some implementations of the present technology, the reflective element is obtained by thin film deposition.

DETAILED DESCRIPTION

The MOEMS devices discussed herein act as sensors, specifically optical accelerometers and gyroscopes, depending on the implementation. As will be described below, some employ tunable Fabry-Pérot (FP) cavities, where the sensor is actuated by an applied acceleration of the chip providing a shift in the operating wavelength that varies linearly with the applied acceleration. Implementations also include tunable mirrors in a FP cavity, where the sensor is actuated by the applied acceleration providing a change in intensity of the transmitted signal depending directly on the applied acceleration. Finally, some implementations are based on a variable optical attenuator (VOA), where the sensor is actuated by the applied acceleration providing a linear change for small displacements of a movable optical element around the waveguide propagation axis, causing a change in the relative signal intensity due to the applied acceleration.

As will be described below, gyroscope devices use a MEMS electrostatic actuator (interdigitated-finger comb drive, hereinafter "comb drive") to oscillate the proof mass along a driving axis. Due to Coriolis force, an applied rotation causes the proof mass and a movable optical element of FP mirror/FP movable mirror to be linearly displaced along a perpendicular sensing direction, proportional to the rotation rate. This displacement is AC modulated by the driving axis oscillations, modulating the VOA actuator/element position of FP mirror/FP gap and the resultant transmitted optical signal/wavelength.

Figure 1:
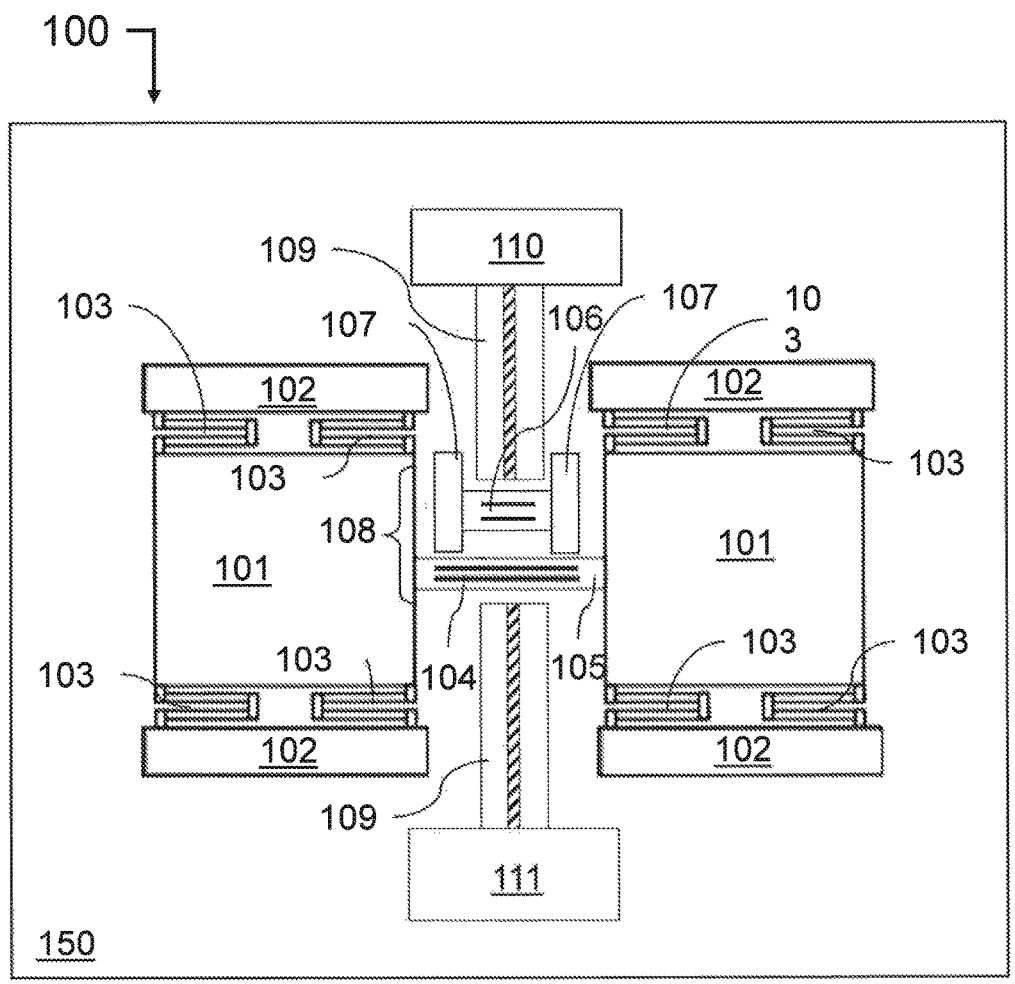
FIG. 1 shows an implementation of a MOEMS accelerometer device on a chip operating spectrally with a tunable cavity.

FIG. 1 illustrates a MOEMS device 100, specifically an optical accelerometer 100, where an acceleration of a chip 150 is measured using a deformable optical cavity, specifically a movable optical element 104 and a fixed optical element 106. There are two proof masses 101, each proof mass 101 being linked to two anchors 102 by four springs 103. It is contemplated that more or fewer anchors 102 and springs 103 could be used, depending on the specific implementation.

Each proof mass 101 is mechanically attached to the optical element 104, which in this implementation is a Bragg mirror. The proof masses 101 are mechanically linked together by the support element 105, the support element 105 supporting the Bragg mirror 104. The fixed optical element 106 provides a reflection, in this case a fixed Bragg mirror, is placed nearby the movable Bragg mirror 104 and is connected to two anchors 107 (thereby rendering it immobile with respect to the chip 150). The optical elements 104, 106 are substantially parallel and separated by a predetermined distance and they form a Fabry-Perot (FP) cavity 108. This cavity 108 is accessed by waveguides 109, specifically optical fibers 109, attached to the chip 150. A tunable laser 110 and a photodetector 111 are optically connected to the fibers 109.

During standard operation of the MOEMS device 100, a first waveguide 109 receives light from the light source 110. A second waveguide 109 receives a portion of the light from the first waveguide 109. As the light passing from one waveguide 109 to the other passes through the cavity 108, the portion of the light received by the second waveguide 109 is altered by changes in the cavity 108. The details of a change to the cavity 108 are described below. Finally, the photodetector 111 detects changes in the portion of the light accepted by the waveguide 109 and delivered to the photodetector 111. The photodetector 111 is generally a photodiode, but other implementations are contemplated.

A displacement of the proof mass 101, caused by an acceleration of the chip, in turn causes a displacement of the movable Bragg mirror 104. Thus the distance between the optical elements 104, 106 changes the length of cavity 108. The transmitted wavelength through 108 depends on the displacement of 104, and therefore depends on the acceleration. The tunable laser 110 and the photodetector 111 enable to obtain a spectrum of light transmitted through the optical system, or allow tracking the resonance wavelength of the FP cavity with a feedback loop from detector 111 to the tunable laser 110 to keep the wavelength of the tunable laser on the wavelength of the FP cavity.

Figure 2:
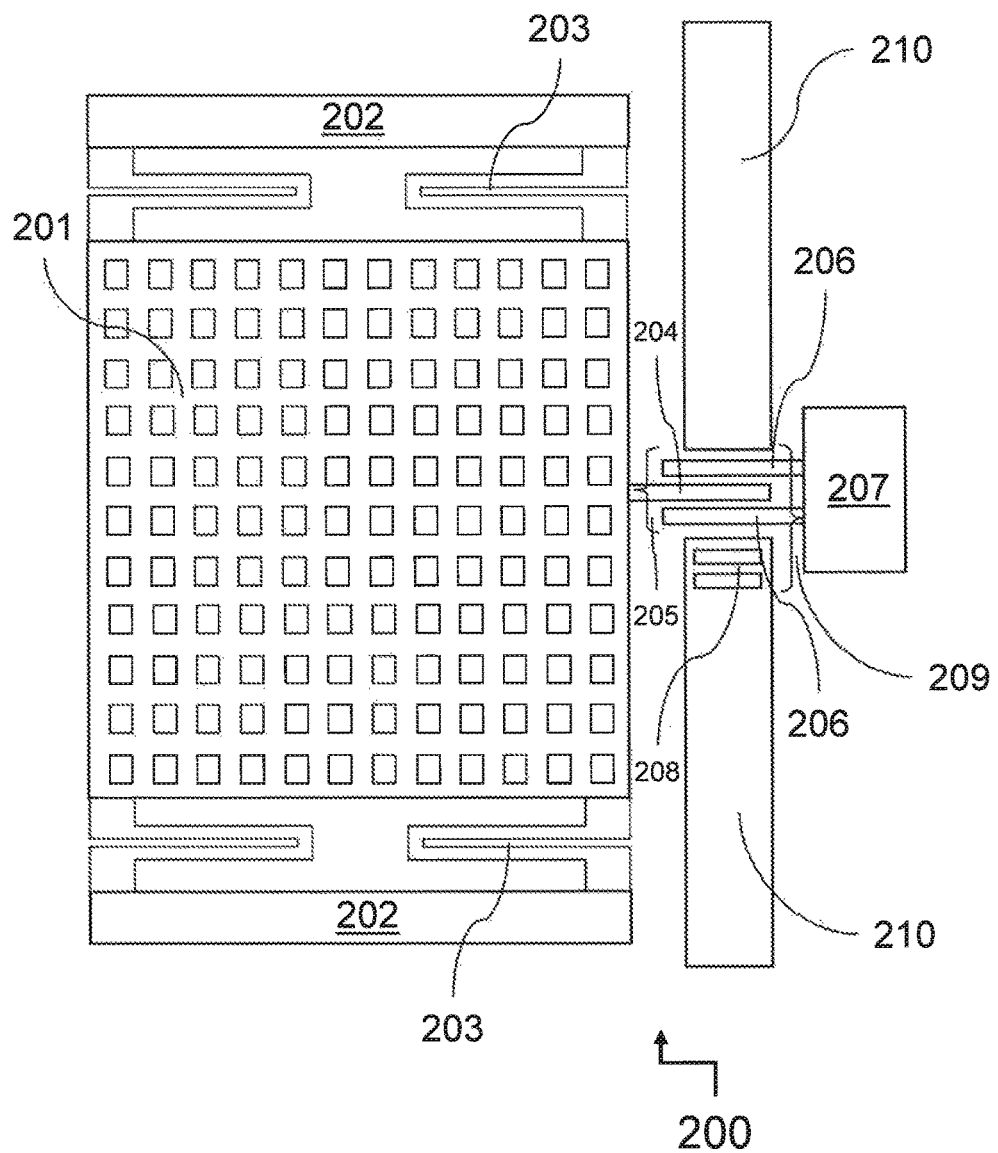
FIG. 2 shows another implementation of a MOEMS accelerometer device operating in amplitude with a modifiable Bragg mirror.

FIG. 2 illustrates an implementation of a MOEMS accelerometer device 200 using a deformable Bragg mirror of an optical cavity 209. The Bragg mirror is deformable as one of the optical elements composing the Bragg mirror is movable and will produce changes in properties of the mirror during such movement. One proof mass 201 are linked to two anchors 202 by four springs 203. The proof mass 201 is mechanically attached to a movable optical element 204 which is a part of a Bragg mirror assembly 205. It is contemplated that more than one proof mass 201 could be mechanically linked together by one or several material elements which can include one or more optical elements.

Two fixed optical elements 206, the remaining parts of the Bragg mirror 205, are connected to an anchor 207. In some implementations, one or more fixed optical elements could be directly connected to a waveguide. The fixed optical elements 206 are fixed and the movable optical element 204 moves with the proof mass 201. Together, they constitute a Bragg mirror 205. Nearby is placed a reflecting element 208, specifically a Bragg mirror 208, substantially parallel to the Bragg mirror 205 and separated from the Bragg mirror 205 by a pre-determined distance. The mirrors 205 and 208 thus form a FP cavity 209. This cavity 209 is accessed by optical waveguides 210, connected to the Bragg mirror 205 and reflecting element 208. It is contemplated that the fixed Bragg mirror components 206 could be integral to the waveguides 210.

With the displacement of the proof mass 201 due to an acceleration of the chip, the optical element 204 moves accordingly, thereby creating a modification of the Bragg mirror 205 properties, being e.g. a shift of the stopband or a reduced reflectivity. This affects the resonance of the cavity 209. The peak of the resonance wavelength gets lowered in amplitude, which is observed in the optical spectrum of the transmission through the optical system, or simply by an amplitude detection over a limited range (around the resonance wavelength and inside the stopband) by a photodetector (not shown). In this way, the acceleration is measured. The simpler amplitude detection can be realized, e.g., with the use of an LED (light-emitting diode) which has a moderate bandwidth and a photodetector (for measuring light amplitude or intensity, shown in FIG. 4). The use of a moderate bandwidth source, in particular one which covers the extents of the transmission peaks but does not exceed the stopband of the Bragg mirror(s), is beneficial because the amplitude received on the detector will correspond to the sole amplitude of the transmission peak. It is also possible to use a detector whose bandwidth is limited to the stopband of the Bragg mirror(s).

Figure 3:
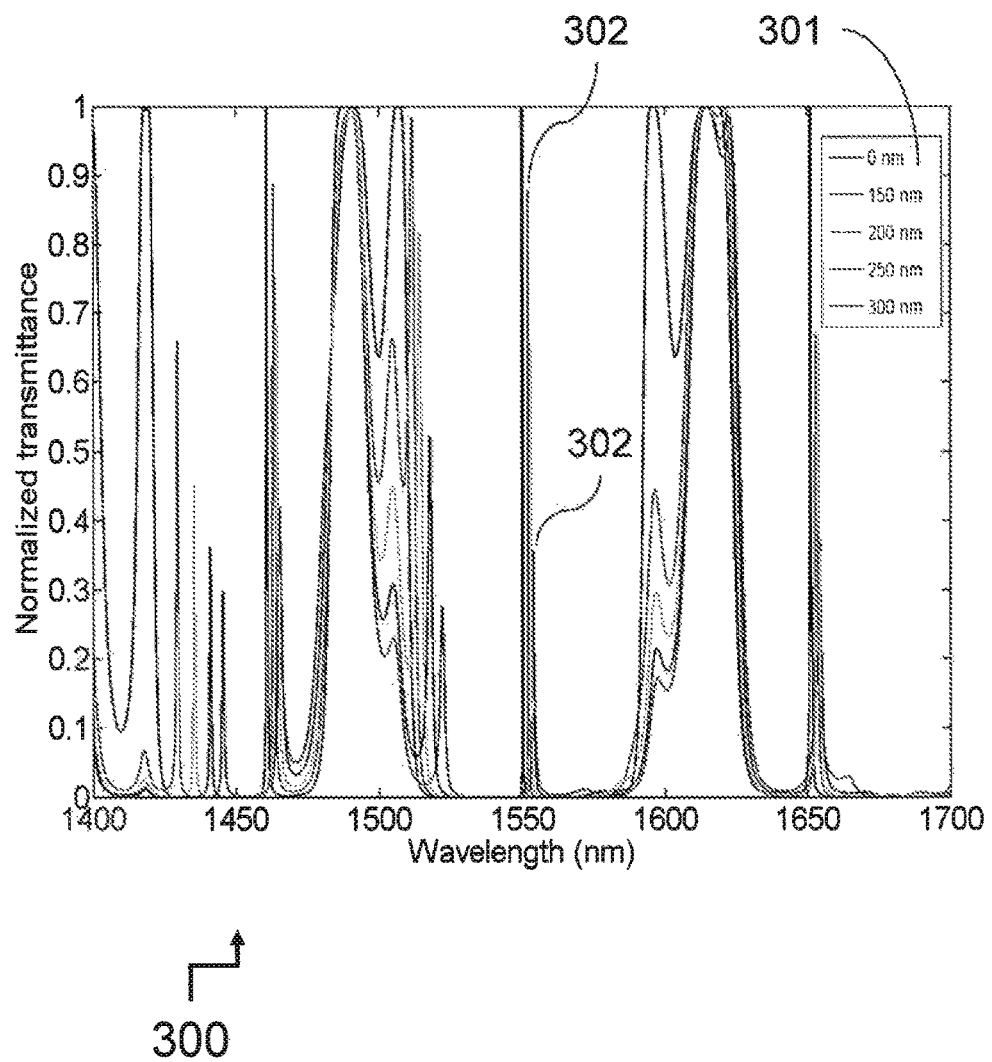
FIG. 3 shows an optical spectrum corresponding to the MOEMS device of FIG. 2.

The change of transmitted amplitude due to the motion of the optical element(s) 204 is demonstrated in FIG. 3 where are represented simulated transmission spectra 300 through the optical system of the MOEMS accelerometer device 200 of FIG. 2, for several displacements shown in the legend 301 of the movable optical element 204 surrounded by the two fixed optical elements 206, the reflecting element 208 being here a Bragg mirror. Transmission peaks 302 are observed over a certain portion of the spectrum. Their amplitude depends on the displacement 301 and follows a monotonous function of it. As such, the photodetector may be used, in place of a more complicated and expensive optical spectrum analyzer (OSA).

Figure 4:
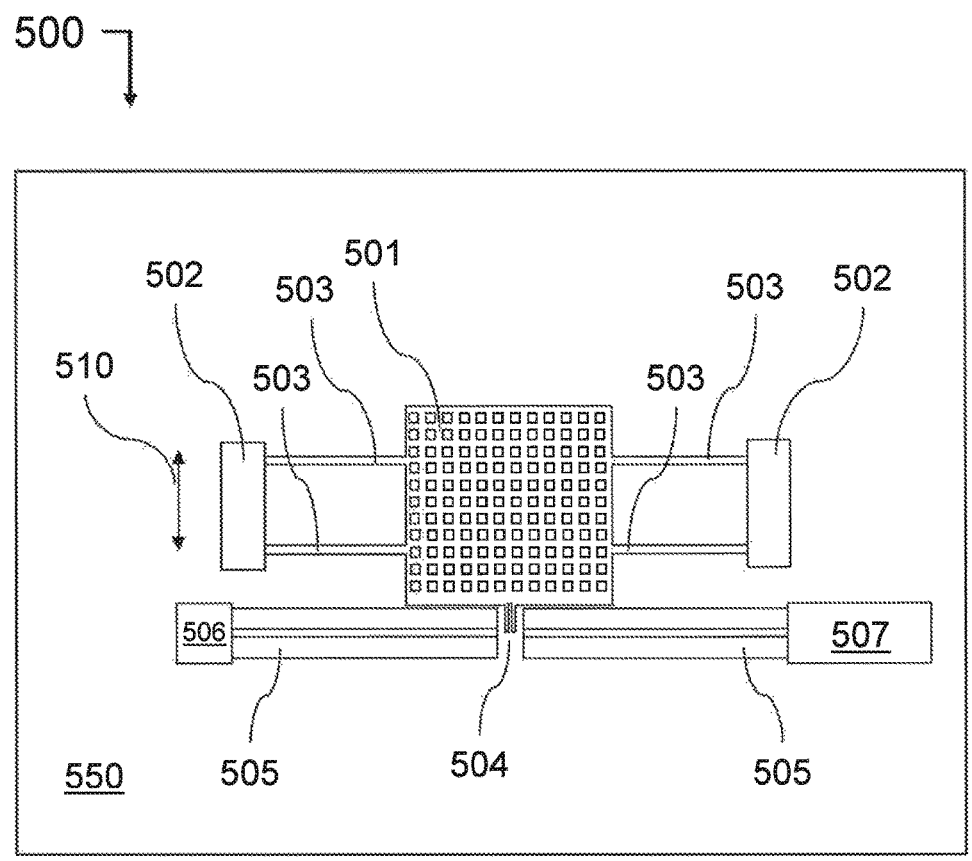
FIG. 4 shows another implementation of a MOEMS accelerometer device on a chip, operating in amplitude with a mobile Bragg mirror.

FIG. 4 illustrates an implementation of a MOEMS accelerometer device 500 where the light portion change due to acceleration of a chip 550 is measured using a mobile shutter. This represents a VOA. A proof mass 501 is linked to two anchors 502 by four springs 503. The proof mass 501 is mechanically attached to a Bragg mirror 504. The Bragg mirror 504 is placed between two optical fibers 505 attached to the chip 550, and shutters substantially half of the portion of light passing from the first optical fiber 505 to the second optical fiber 505 when the chip is at rest (its extremity is substantially at the central axis of the fiber cores). Because this Bragg mirror 504 reflects part of the light, it decreases the light transmitted from fiber to fiber 505. Due to an acceleration, the Bragg mirror 504 moves with the proof mass 101 along a direction of motion 510 and shutters a larger part or a smaller part of the optical beam (the portion of light passing from one fiber 505 to the other 505). The amplitude of light transmitted sees therefore a decrease or an increase. A source of light 506, specifically an LED 506, is coupled to the first fiber 505, and a photodetector 507, specifically a photodiode 507, is coupled to the other fiber 505. In this way the amplitude of the portion of light transmitted is measured and from this the acceleration is determined.

Figure 5:
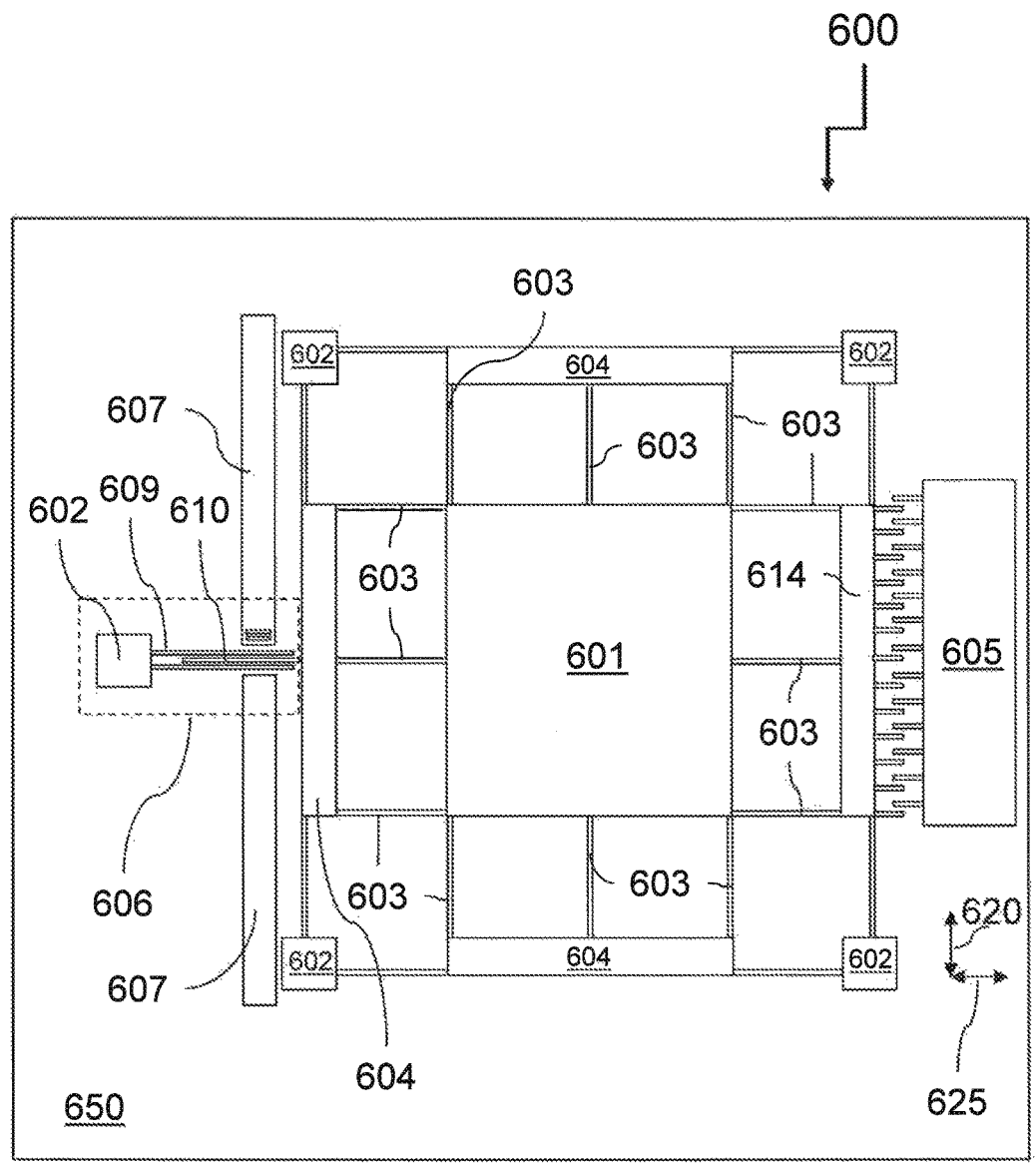
FIG. 5 shows an implementation of a MOEMS gyroscope device on a chip, operating in amplitude with a modifiable Bragg mirror.

FIG. 5 illustrates a MOEMS gyroscope device 600 for determining rotation of a chip 650. A proof mass 601 is linked to four anchors 602 by springs 603. In addition, there are three side plates 604 connecting a portion of the springs 603 together. It is contemplated that there could be more or fewer springs 603 and side plates 604, depending on the implementation.

The side plate(s) 604 are placed such that their movement will be decoupled from the proof mass 601 along a sensing direction 620 and a driving direction 625. The proof mass 601 is driven by a comb drive 605, operatively coupled to the proof mass 601 via one side plate 614. An angular velocity will then cause a shift of the proof mass 601 in a direction perpendicular to the driving direction 625 due to Coriolis force (the sensing direction 620). An optical system 606, which is similar to the ensemble of elements 204 to 210 of FIG. 2 operates in the same way described above in relation to FIG. 2, i.e. the Bragg mirror is modified and the amplitude of the peak of the resonance wavelength decreases. In this way, the angular velocity is measured. The optical system 606 is accessed by optical waveguides 607.

Figure 6:
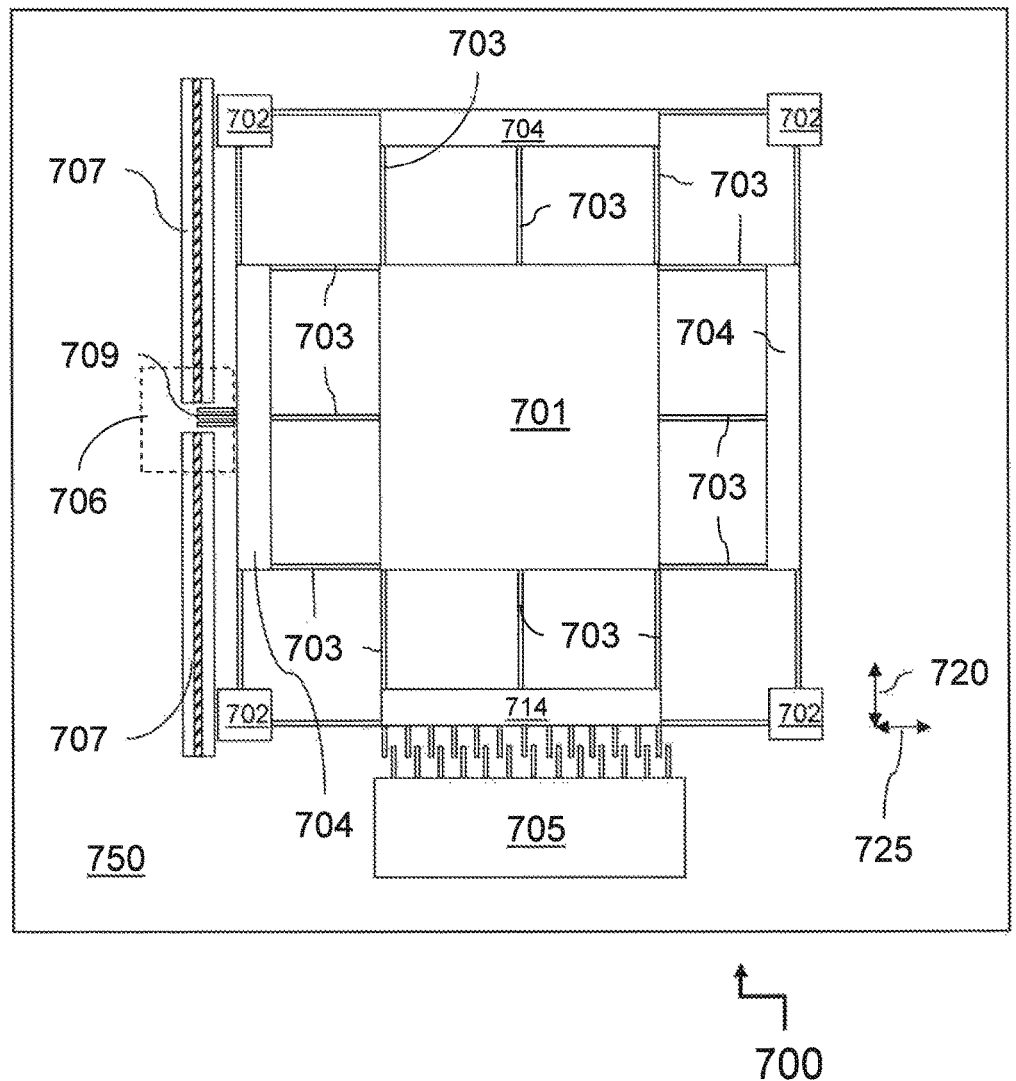
FIG. 6 shows another implementation of a MOEMS gyroscope device on a chip, operating in amplitude with a mobile Bragg mirror.

FIG. 6 illustrates a MOEMS gyroscope device 700 for determining rotation of a chip 750, where the response is measured using a mobile shutter (VOA). The elements 701 to 705 and 714 are the same as the elements 601 to 605 and 614 of FIG. 5, respectively, and they are organized in the same way and perform the same function. The optical system 706, which is equivalent to the element 504 of FIG. 4, and of which at least one optical element is attached to the side plate 704, operates as described above with regard to FIG. 4. Specifically, the amplitude of the light portion transmitted between the waveguides 707 will be increased or decreased, depending on the displacement of the Bragg mirror, itself linked to angular velocity through the Coriolis force. The waveguides 707 in this implementation are multimode optical fibers 707. It is contemplated that waveguides 707 could be integral to the chip 750.

Figure 7:
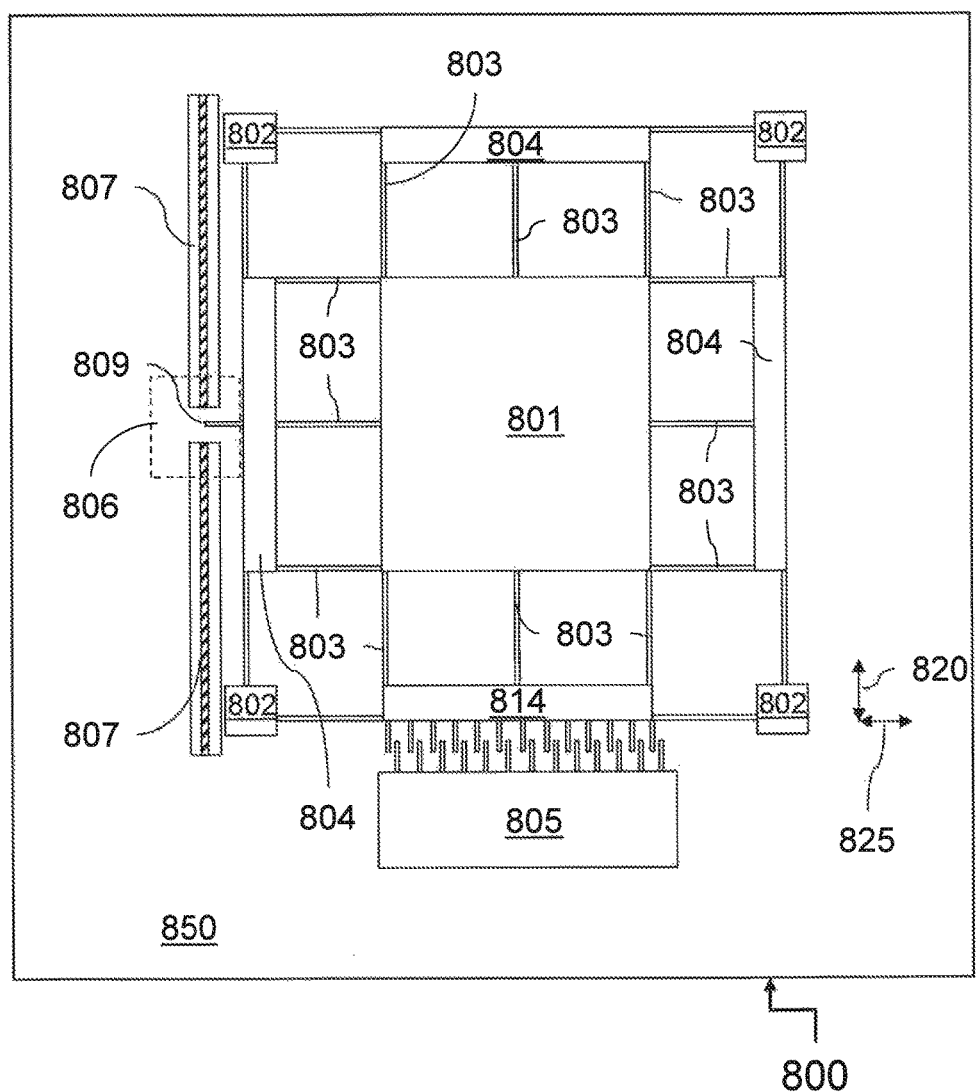
FIG. 7 shows another implementation of a MOEMS gyroscope device on a chip, operating in amplitude with a reflecting element.

Another embodiment, a MOEMS gyroscope 800, is illustrated in FIG. 7. The elements 801 to 807 and 814 are similar to the elements 701 to 707 and 714 of FIG. 6, respectively, except that the element 806 is, in this implementation, a mobile shutter 806 composed of one movable reflective element 809. The reflective element 809 is gold metallic coated, but it is contemplated that the reflective element 809 could be composed of or coated by other metals.

Figure 8:
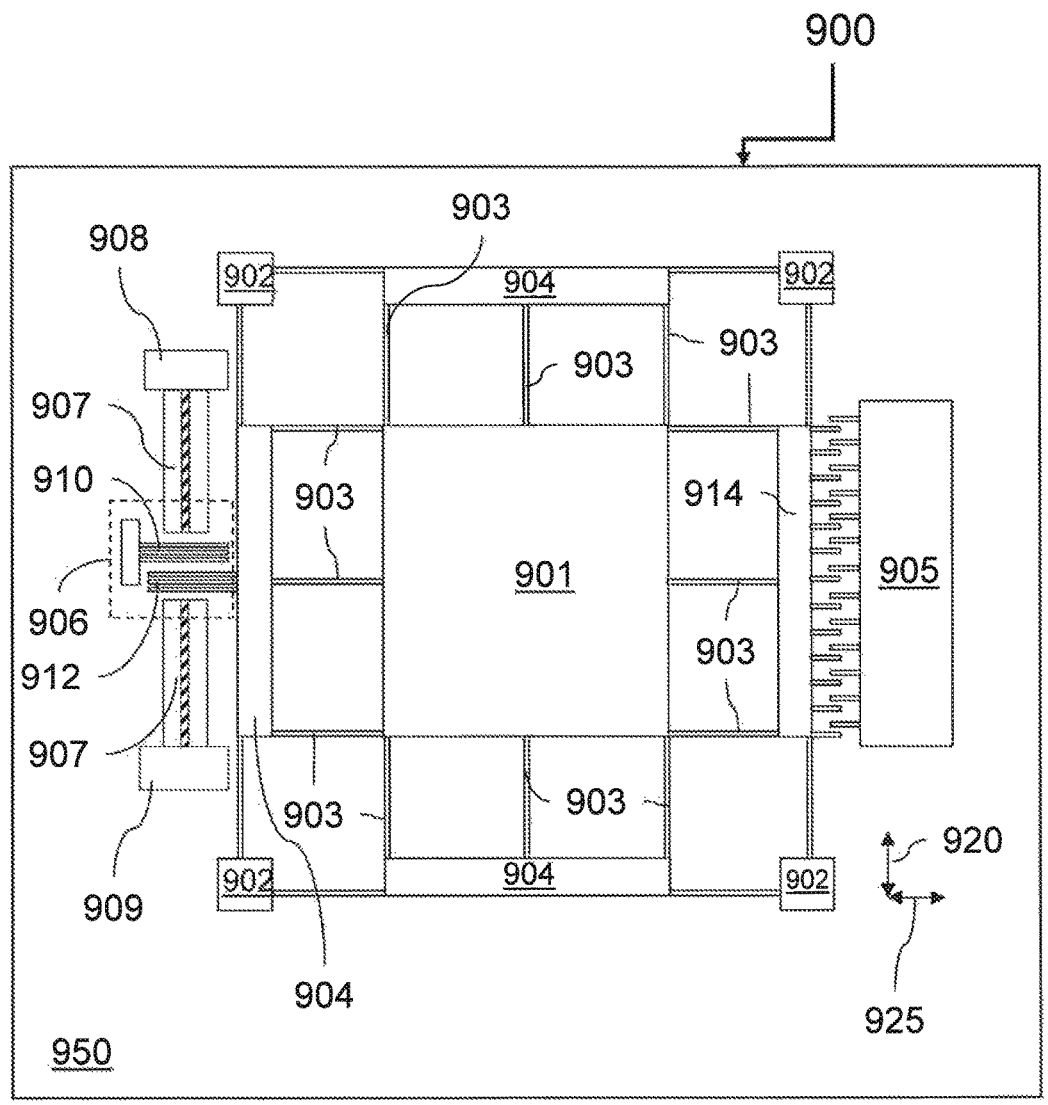
FIG. 8 shows another implementation of a MOEMS gyroscope device on a chip, operating spectrally with a tunable cavity and tunable source.

FIG. 8 illustrates another implementation of a MOEMS gyroscope device 900 where rotation of a chip (not shown) is measured using a deformable optical cavity, similar to those described above. The elements 901 to 905 and 914 are similar in operation to the elements 601 to 605 and 614 of FIG. 5, respectively, and they are organized in the same way and perform the same function. The optical system 906 is equivalent to the ensemble of elements 104 to 109 of FIG. 1. A Bragg mirror 912 is attached to one of the side plates 904 and a fixed Bragg mirror 910 attached to an anchor constitute an FP cavity 906. Due to rotation of the chip, the FP cavity 906 will be modified in the same way, i.e. the FP cavity length is modified and the transmitted wavelength depends on the displacement of the movable optical element 912, itself linked to the angular velocity through the Coriolis force. The optical system 906 is accessed by optical fibers 907, and the position or the tracking of the resonance wavelength is obtained using to a tunable laser 908 and a photodetector 909, like for the optical accelerometer 100.

Figure 9:
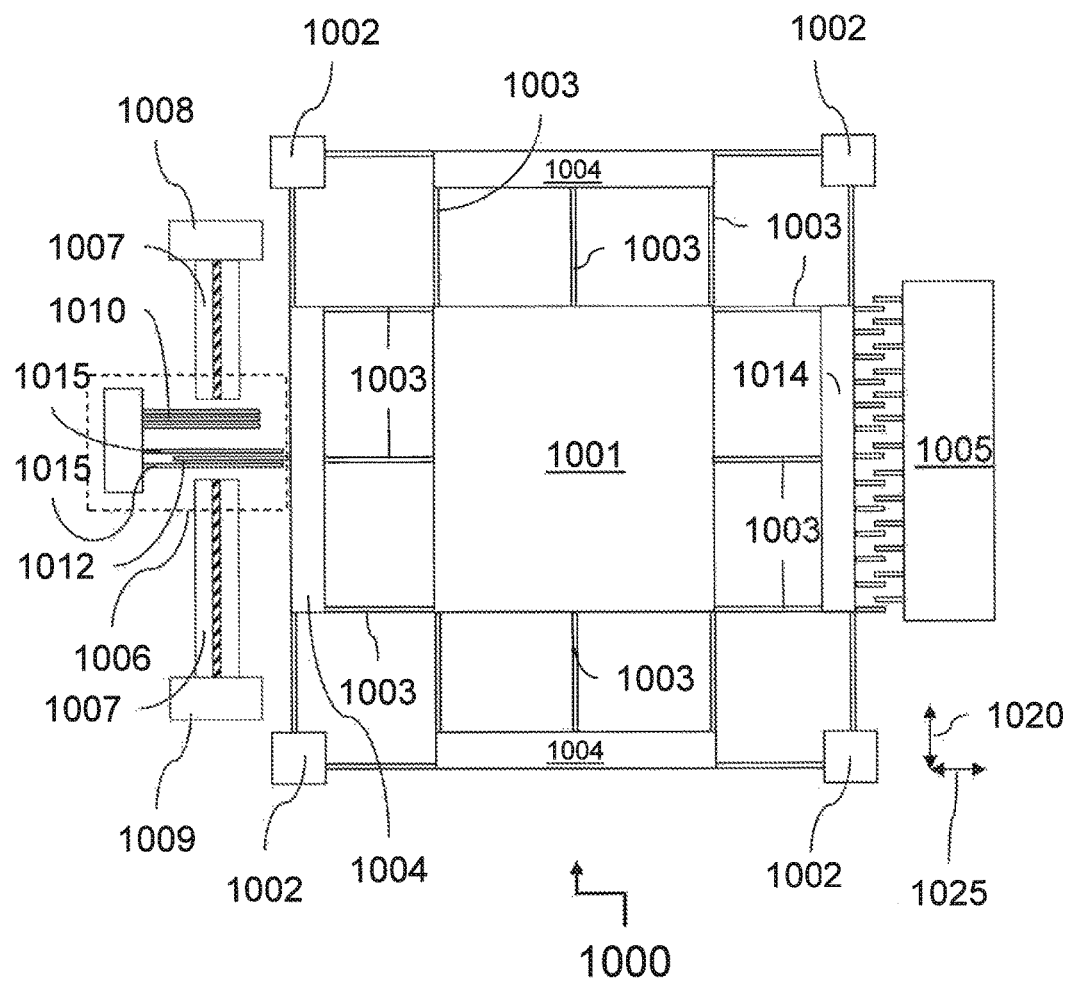
FIG. 9 shows another implementation of a MOEMS gyroscope device operating in amplitude with a light source of moderate bandwidth.

FIG. 9 illustrates another implementation of a MOEMS gyroscope device 1000 where rotation of a chip is measured using a deformable mirror of an optical cavity 1006. The elements 1001 to 1005 are the same as the elements 601 to 605 of FIG. 5, respectively, and they are organized in the same way and perform the same function. The optical system 1006, which is analogous to the ensemble of elements 204 to 209 of FIG. 2, has one movable optical element 1012 attached to the side plate 1004 and fixed optical elements 1010 and 1015. The optical elements 1010, 1012, and 1015 make up an FP cavity 1006 composed of Bragg mirrors. As before, the Bragg mirror gets modified and the amplitude of the peak of the resonance wavelength decreases. By this way, the angular velocity is measured due to the Coriolis force at the origin of the displacement of the movable optical element 1012 inside the cavity 1006. The optical system 1006 is accessed here by optical fibers 1007. A source of light 1008 of moderate bandwidth (such as e.g. an LED) coupled to a fiber 1007, and a photodetector 1009 (such as e.g. a photodiode) coupled to the other fiber 1007, allow to measure the amplitude of light transmitted and therefore determine the angular velocity.

Figure 10:
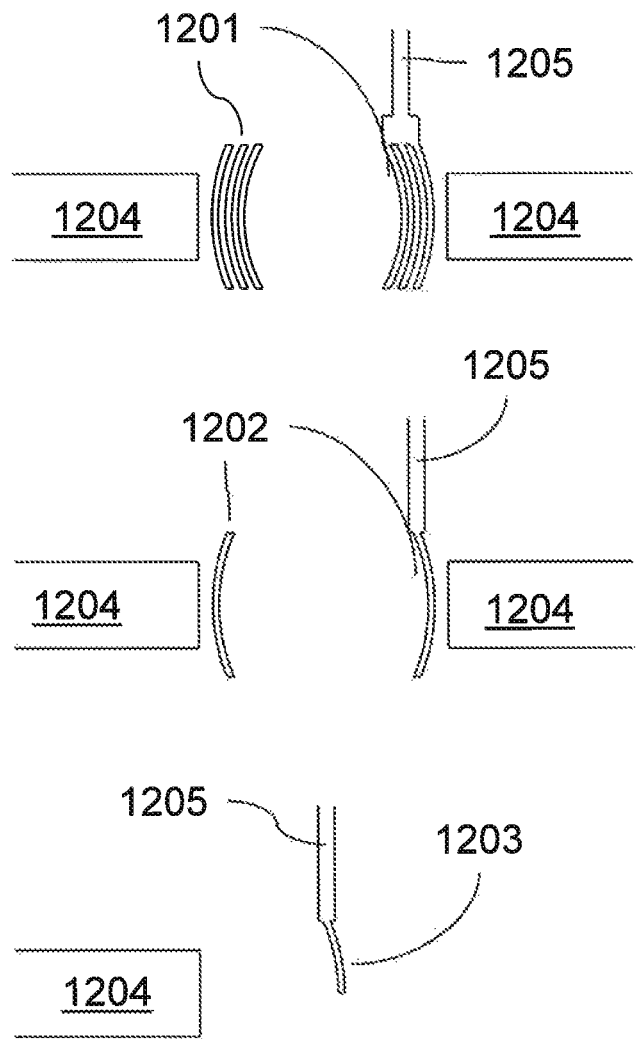
FIG. 10 shows an alternative of the optical part of an optical integrated accelerometer or gyroscope, with curved elements.

FIG. 10 illustrates alternative implementations of optical elements (fixed or movable) to be used in MOEMS devices as described above. The reflective optical elements described above, such as a Bragg mirror or a metallic mirror (e.g. 104, 107, 205, 208, or 504), may be replaced by curved versions 1201, 1202, or 1203 (e.g. with a circular curvature) instead of straight ones (shown with waveguides 1204). The mobile curved optics 1201, 1202 and 1203 are connected to a mobile arm 1205, in turn connected to a proof mass, as described above.

For example, at least one of the reflective elements 1201, or 1202, (mirrors) constituting a FP cavity can be curved towards the cavity (concave element). This can provide a reduction in the divergence of the beam, or a focusing of the beam, depending on the implementation. The losses of the cavity can consequently be reduced and the quality factor increased, enhancing thereby the sensitivity. For a shutter style assembly, the curved element such as element 1203 can increase the amount of reflected light into the guiding element, by a better divergence control or focalization.

Figure 11:
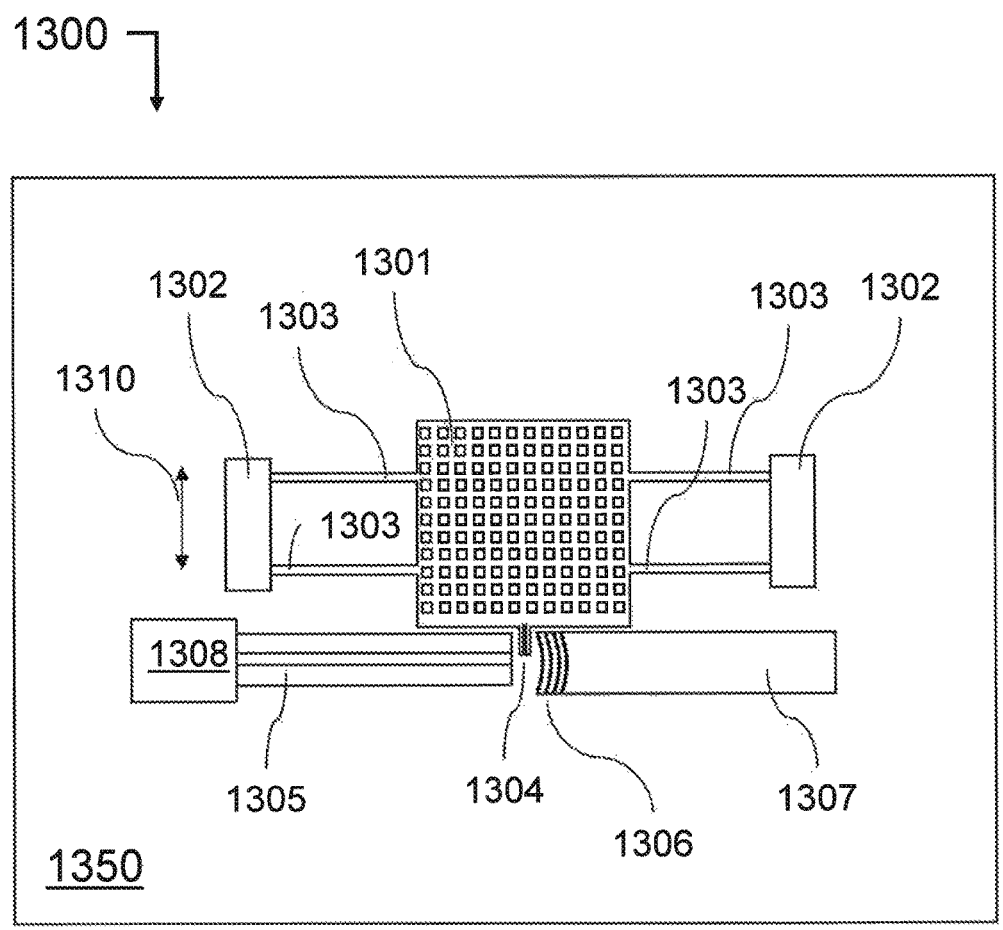
FIG. 11 shows an implementation of a MOEMS sensing device on a chip operating in amplitude with a mobile shutter and a reflecting element.

FIG. 11 illustrates an implementation of a MOEMS device 1300 utilizing a curved optical element. A proof mass 1301 is linked to two anchors 1302 by four springs 1303. The proof mass 1301 is movable in a displacement direction 1310. A movable optical element 1304 is connected to the proof mass 1301. The movable optical element 1304 operates as a shutter, where the optical element 1304 limits the amplitude of the light portion transmitted from the input guiding element 1305 to the output waveguide 1307 upon movement in the displacement direction 1310 caused by an external acceleration to the chip 1350. In this implementation, the movable optical element is a metallic mirror diverting the light away from the optical area of the device 1300, but it is also contemplated that the optical element 1304 could be an absorber or a Bragg mirror.

This optical element 1304 (shutter) is placed between the waveguide 1305, and a fixed optical element 1306 reflecting the light. This reflecting element 1306 is a Bragg mirror and is curved to send back more light to the guiding element 1305. In other implementations, the element 1306 could be a reflecting metal. It may be part of another element 1307 such as a waveguide or attached to an anchor, or may be on its own. The shutter 1304 is positioned at rest with its extremity substantially at the central axis of the guiding element 1305 so that it shadows substantially half of the optical beam and so that the reflecting element 1306 reflects substantially the other half of the beam. Due to an acceleration, the optical element 1304 moves with the proof mass 1301 and shutters a larger part or a smaller part of the portion of light from reflection by the reflecting element 1306. A photodetector (not shown) measures the amplitude of the light portion reflected, which therefore sees a decrease or an increase depending on the acceleration of the chip.

Figure 12:
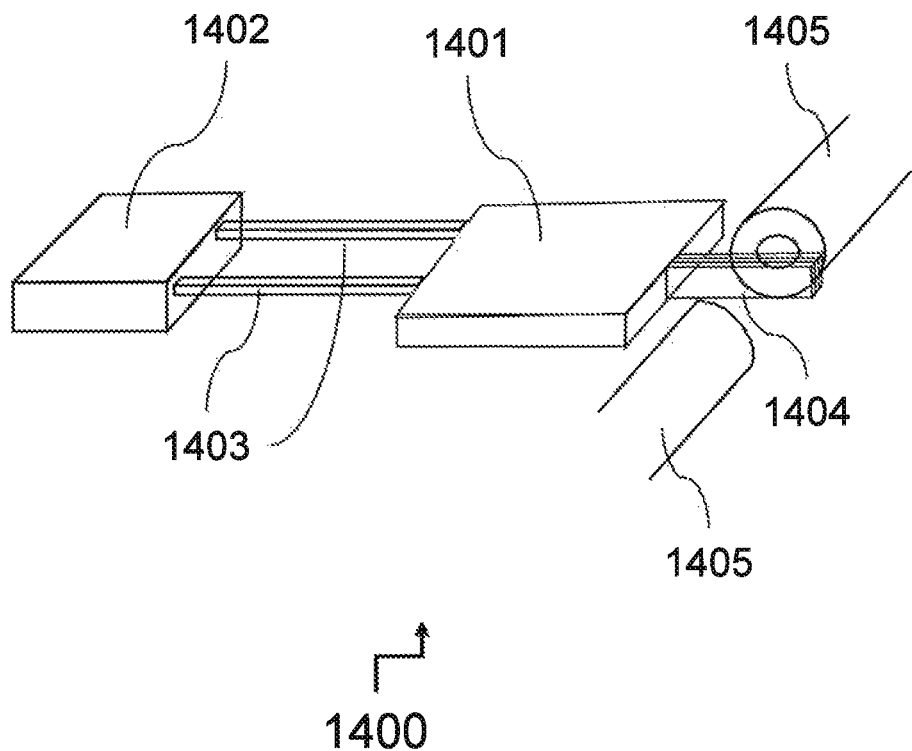
FIG. 12 shows an implementation of a MOEMS sensing device operating for a vertical (out-of-plane) motion.

FIG. 12 illustrates a MOEMS device 1400 for detection of vertical (out-of-plane) motion using a mobile shutter (similar to that described above). A proof mass 1401 is linked to an anchor 1402 by two springs 1403. The springs 1403 are designed primarily for a vertical elasticity, such that the proof mass 1401 is movable in the direction generally perpendicular to the plate of the chip, in this case generally vertical. The proof masses 1401 includes movable optical element 1404. This optical element 1404, a Bragg mirror 1404, is placed between two guiding elements 1405 attached to a chip (not shown). The mirror 1404 shutters substantially half of the light portion passing from one waveguide 1405 to the other waveguide 1405 at rest (its top surface is substantially placed at the central axis of the guiding elements 1405). Because the optical element 1404 blocks part of the light, it decreases the light transmitted from one guiding element 1405 to the other. Due to a vertical acceleration, the optical element 1404 moves vertically with the proof mass 1401 and shutters a larger part or a smaller part of the optical beam. The amplitude of the portion of light transmitted sees therefore a decrease or an increase. This allows measuring the vertical acceleration. For an implementation of such as device as a gyroscope, a comb drive would be added in-plane to actuate the proof mass, and this would allow detecting an angular velocity with its axis in-plane, through the vertical movement due to Coriolis force.

In some implementations, two MOEMS in-plane accelerometers can be combined into a single x-y accelerometer, by placing two mobile optical elements and the associated guiding elements at perpendicular directions (e.g. on two sides of the proof mass), using one same proof mass with its springs. It is also possible to add the z direction using an out-of-plane motion sensor 1400, with its mobile optical element attached to the same proof mass.

Figure 13:
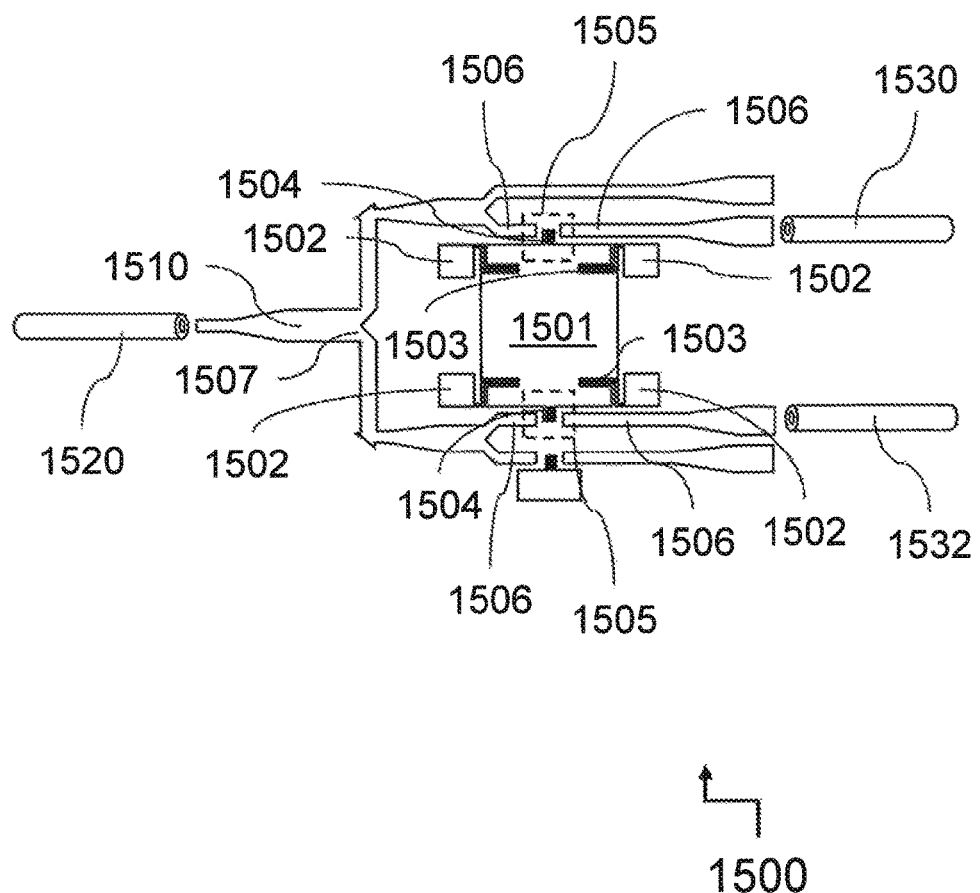
FIG. 13 shows an implementation of a MOEMS sensing device using a differential measurement.

FIG. 13 illustrates another implementation of a MOEMS device 1500, according to the present technology. A proof mass 1501 is linked to four anchors 1502 by four springs 1503. The proof mass 1501 is connected to at a pair of optical elements 1504, each being a part of an optical part 1505. Light is brought to each optical part 1505 by two input waveguides 1506. The input waveguides 1506 are connected to a single input waveguide 1510 (guiding light from light source 1520) using a splitter part 1507. The pair of input and output waveguides 1506 are positioned symmetrically about the proof mass 1501. In an acceleration of the chip, the mobile optical elements 1504 displace in the same direction, resulting in an opposite effect on the light portion in the optical parts 1505. A differential measurement is then performed in the two output waveguides 1506, which can increase the sensitivity of the device 1500. The optical parts 1505 here are mobile reflecting or obscuring shutters, but it is contemplated that they could be FP cavities with modifiable Bragg mirrors, or tunable FP cavities. A comb drive would be added if the device 1500 is modified to be a gyroscope. An acceleration or an angular velocity creates a displacement of the proof mass 1501 and the optical elements 1504, creating a displacement of resonance wavelengths or a change in amplitude of the transmitted signals, depending on the optical parts 1505 used, and thereby allows the measure of this acceleration or an angular velocity (as described above). In some implementations, there are several proof masses 1501 mechanically linked together by one or several material elements, these elements possibly including the optical elements 1504. This differential measurement can also be used for out-of-plane motion sensors, such as the device 1400.

It is contemplated that in some implementations, MOEMS accelerometers or gyroscopes could be constructed wherein the optical part (such as 108, 209, 504, 606, 706, 806, 906, 1006, 1200, 1404, or 1505) is now used in reflection. The accelerometer or gyroscope can then be accessed with only one guiding element (e.g. waveguide or optical fiber). This can reduce fabrication cost and facilitate assembly. The chip might be accessed with only one optical fiber and could use only a single light source for all the MOEMS devices. A splitter for light going in and coming back might then be used. The part of light which is reflected is substantially the one which is not transmitted, when other losses are not considered. It is therefore possible to monitor the spectral or amplitude change in the reflected light and determine the acceleration or angular velocity by this way. The initial output guiding element (e.g. waveguide or optical fiber) might be removed. It is also possible to measure both the transmission and the reflection, e.g. to get additional information, and as a possibility use them in a differential measurement.

In the different implementations presented, it should be noted that the displacement of an optical element such as a part of, or an entire Bragg mirror, in a direction along the plane of this element, does not affect the optical properties of this optical part (e.g. FP cavity). Therefore, the optical measurement of a displacement e.g. along y, is decoupled from a displacement along x or z. Additionally, for a shutter designed to move e.g. in the direction y, a displacement along z does not affect its optical properties and a displacement along x would affect them minimally. These different optical configurations have thus the advantage of making independent measurements along different directions.

Figure 14:
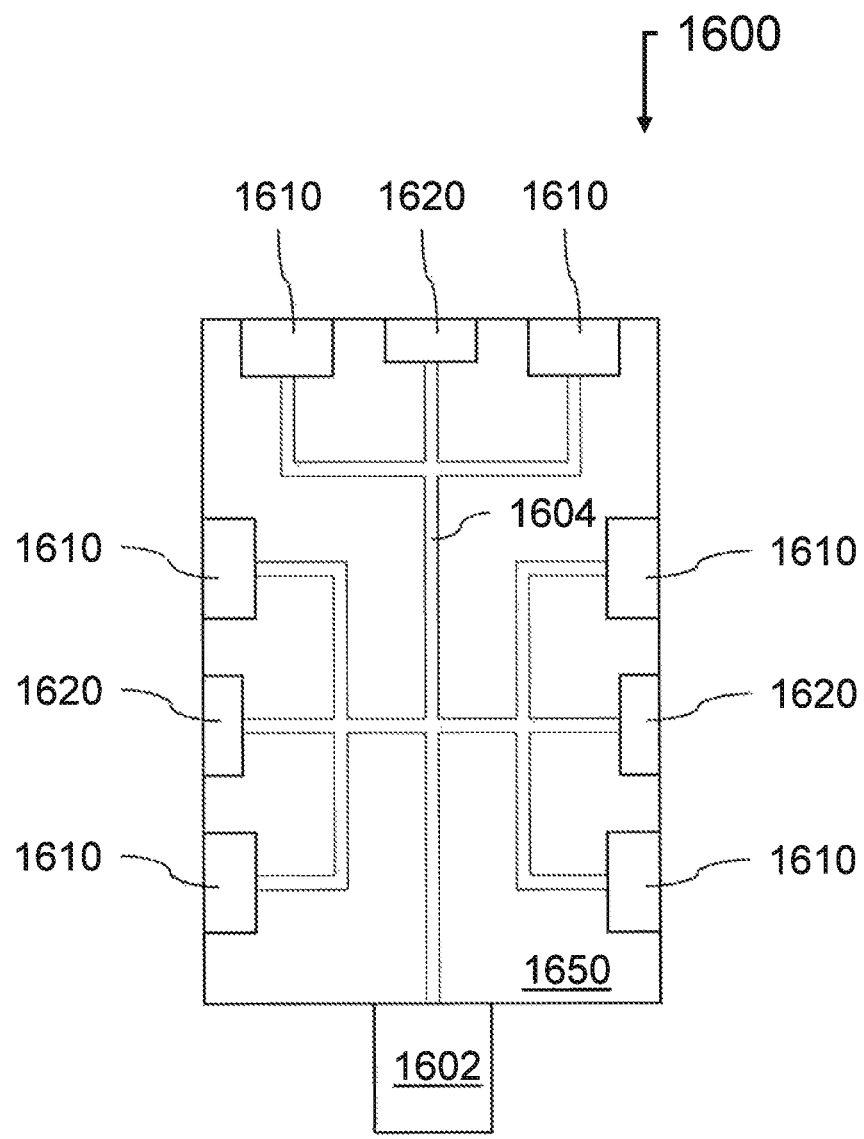
FIG. 14 shows an implementation using several MOEMS sensing devices integrated on the same chip.

FIG. 14 illustrates a schematic configuration of a MOEMS based sensing device. The sensing device 1600 utilizes several MOEMS devices, including any of the implementations of the accelerometers and/or the gyroscopes described above, integrated on the same chip 1650. This is also referred to as an integrated optical multiple motion sensor 1600. As illustrated in FIG. 14, two embodiments 1610 and 1620 of the MOEMS devices are integrated together to provide a full six-degrees of freedom motion sensor 1600. The different accelerometers and/or gyroscopes (in-plane and/or vertical), which can comprise the previously mentioned accelerometers and/or gyroscopes (100, 200, 500, 600, 700, 800, 900, 1000, 1300, 1400, or 1500), as well as other accelerometers and/or gyroscopes, are accessed by waveguides 1604 on the chip. T-bar splitters, cross-splitters, star-splitters, or other kinds of beam separation devices can be used to distribute the light into the MOEMS devices 1610, 1620. Several inputs/waveguides 1604 guide light from the light source 1602 to the MOEMS devices 1610, 1620. The devices 1610, 1620 may also be used to perform the several sorts of measurements together. The input waveguide(s) and output waveguides may be accessed by other guiding elements such as optical fibers.

Most of the different kinds of motions (the six-degrees of freedom) are decoupled from each other thanks to the previously mentioned opto-mechanical designs. In cases where it would not be possible to decouple the motions, compensation could be realized by subtracting from the coupled motion sensor the value obtained with a decoupled motion sensor.

Integrating different optical inertial sensors on a unique substrate (a single chip) can contribute to reducing the amount of external fiber optic interconnections, consequently decreasing the overall system mass and size, and contribute to the optimization of the system reliability as well as its cost efficiency. The end product could exhibit a great reduction in system mass and size.

The navigator microchip also represents the ability of accommodating diverse attitude and inertial sensors on the same microchip to eliminate the need of many separate sensors. The end product exhibits orders of magnitude reduction in system mass and size. Furthermore, redundancy improves the net performance and precision of the navigation measurement systems.

In another embodiment, the integrated optical multiple motion sensor could be operated using multiple wavelengths or bands of wavelengths, in a sort of multiplexing way, to reduce the number of guiding elements needed, such as optical fibers. As an example, three LEDs with different wavelength bands could be used as source of light for three motion sensors based on FP cavity with a modifiable Bragg mirror. The wavelength bands could be split on the chip (with dichroic beamsplitters) into different waveguides, would then pass through the three optical parts of sensors, and would be recombined in one waveguide. Or the combined wavelength bands could be simply split in power into different waveguides, would then all pass through the three optical parts of sensors, and would be recombined in one waveguide. The FP cavities would be designed to operate on the three different wavelength band (three different transmission peaks, but the three stopbands overlapping enough), and the three amplitudes detected would therefore not perturb each other. The chip could then be accessed by a single optical fiber and the returning wavelengths can be separated spectrally, or detected with different wavelengths sensitive detectors.

For the above described implementations, different light sources could be used. These include, but are not limited to: Fabry-Perot based lasers, distributed Bragg reflector lasers, distributed feedback lasers, VCSELs, LEDs, wide bandwidth LEDs, and tunable lasers. The waveguides used in the above described implementations could include, but are not limited to: bulk wave guides, bulk waveguides integral to the chip, monomode fibers, glass fibers, and multimode fibers.

Concerning the coupling between an optical fiber and a waveguide on the chip, a groove needs to be etched down to accommodate the fiber and match the position of its core with the on-chip waveguide. With the spacing between the fiber and the waveguide, some divergence of the beam will occur between the exit of the fiber and the entry of the waveguide. Therefore the waveguide should be at minimum a bit thicker than the fiber core, in a proportion given by the formula of beam expansion.

The following generally describes fabrication of the device 100, 500, etc on the chip, such as the chips 150, 550, etc as described above. The MOEMS devices 100, 200, 500, 600, 700, 800, 900, 1000, 1300, 1400, 1500, 1600 are fabricated on Silicon-on-insulator (SOI) wafers (the chips 150, etc). An SOI wafer consists of a silicon layer on top called a Device Layer, an oxide layer in the middle called BOX, and a bulk silicon layer on the bottom called Handle layer. All of the above described devices are defined in the top silicon layer (device layer). The SOI wafer has the following specifications: 11 µm thickness Si device layer (resistivity=100 Ω·cm), 3 µm $SiO_2$ layer (buried oxide (BOX) layer or barrier layer), and 500 µm Si-handle layer. The proof mass is composed of all three layers. Lithography is performed to define the device layer (waveguide, Bragg mirror, springs, etc.). It is to be understood that the materials, etching agents, and sizes may be adapted or modified for other requirements (e.g. working wavelength or size of optical fiber), without departing from the scope of the present technology.

In the case of a suspended proof mass with backside etching added mass, the constraint on the device (optical) layer thickness is alleviated since this layer does not need to possess anymore a high volume for the mass. This offers a great flexibility for the device layer thickness. Thicknesses of e.g. 2 µm or 200 nm are therefore possible. For example it is thus possible to use a thin layer to host silicon photonics monomode devices, being monomode at least in the vertical direction, i.e. using, or etched into, a slab monomode planar waveguide. This thin layer can also be used to host microelectronics components, such as CMOS components.

In order to connect an optical fiber to the chip to access the active optical part or a waveguide, it is useful to place the fiber in a groove realized on the chip. The immobilization of the fiber is frequently done using UV curing glue. A reservoir is usually integrated, but there is a risk of the glue flowing to the MEMS or the optical sensing part and making them unusable. Another advantage of the backside proof mass etching is that a hole is present in the backside, which will divert the glue flow and avoid it reaching the MEMS or the optical sensing parts.

What is claimed is:

1. A micro-opto-electromechanical systems (MOEMS) device, comprising:
    at least one anchor on a chip;
    at least one spring connected to the at least one anchor;
    at least one proof mass connected to the at least one spring, the at least one proof mass being movable with respect to the chip;
    a movable optical element connected to the at least one proof mass;
    a first waveguide connected to the chip, the first waveguide being adapted for receiving light from a light source through a front end and delivering light through a back end; and
    a second waveguide connected to the chip, the second waveguide being adapted for receiving light from the first waveguide through a front end and delivering light through a back end, the second waveguide being adapted for operatively coupling to a photodetector; and
    at least one fixed optical element,
    the movable optical element and the at least one fixed optical element being disposed between the back end of the first waveguide and the front end of the second waveguide, the movable optical element and the at least one fixed optical element forming at least part of a deformable Bragg mirror.

2. The MOEMS device of claim 1, wherein the movable optical element and the at least one fixed optical element further form at least part of a Fabry-Perot cavity.

3. The MOEMS device of claim 1, wherein the MOEMS device is a gyroscope adapted for measuring rotational rate, the gyroscope further comprising:
    at least one side plate connected to the at least one spring; and
    a comb drive connected to the chip, the comb drive operatively connected to the at least one proof mass through the at least one side plate, the comb drive providing driving oscillations to the at least one proof mass.

4. The MOEMS device of claim 1, wherein the MOEMS device is an accelerometer adapted for measuring an external acceleration applied to the chip.

5. A micro-opto-electromechanical systems (MOEMS) device, comprising:
    at least one anchor on a chip;
    at least one spring connected to the at least one anchor;
    at least one proof mass connected to the at least one spring, the at least one proof mass being movable with respect to the chip;
    a movable optical element connected to the at least one proof mass, the movable optical element being curved;
    a first waveguide connected to the chip, the first waveguide being adapted for receiving light from a light source through a front end and delivering light through a back end; and
    a second waveguide connected to the chip, the second waveguide being adapted for receiving light from the first waveguide through a front end and delivering light through a back end, the second waveguide being adapted for operatively coupling to a photodetector,
    the movable optical element being disposed between the back end of the first waveguide and the front end of the second waveguide.

6. The MOEMS device of claim 5, wherein the first and second waveguides are integral to the chip.

7. The MOEMS device of claim 5, wherein the MOEMS device is an accelerometer adapted for measuring an external acceleration applied to the chip.

8. The MOEMS device of claim 5, wherein the MOEMS device is a gyroscope adapted for measuring rotational rate, the gyroscope further comprising:
    at least one side plate connected to the at least one spring; and
    a comb drive connected to the chip, the comb drive operatively connected to the at least one proof mass through the at least one side plate, the comb drive providing driving oscillations to the at least one proof mass.

9. A multi-axis MOEMS-based sensing device on a chip, comprising:
    a plurality of micro-opto-electromechanical systems (MOEMS) devices, the plurality of MOEMS devices being oriented in a plurality of directions, each device of the plurality of MOEMS devices comprising:
        at least one spring connected to the chip;
        at least one proof mass connected to the at least one spring, the at least one proof mass being movable with respect to the chip;
        a movable optical element connected to the at least one proof mass;
        a first waveguide connected to the chip, the first waveguide being adapted for receiving light from a light source through a front end and delivering light through a back end; and
        a second waveguide connected to the chip, the second waveguide being adapted for receiving light from the first waveguide through a front end and delivering light through a back end, the second waveguide being adapted for operatively coupling to a photodetector,
        the movable optical element being disposed between the back end of the first waveguide and the front end of the second waveguide, and
        for at least one device of the plurality of MOEMS devices, the movable optical element being curved.

10. The multi-axis MOEMS-based sensing device of claim 9, wherein at least one MOEMS device of the plurality of MOEMS devices is an accelerometer adapted for measuring an external acceleration applied to the chip.

11. The multi-axis MOEMS-based sensing device of claim 9, wherein at least one MOEMS device of the plurality of MOEMS devices is a gyroscope adapted for measuring rotational rate, the gyroscope further comprising:
- at least one side plate connected to the at least one spring; and
- a comb drive connected to the chip, the comb drive operatively connected to the at least one proof mass through the at least one side plate, the comb drive providing driving oscillations to the at least one proof mass.

12. The multi-axis MOEMS-based sensing device of claim 9, further comprising at least one other MOEMS device acting as a reference, the one other MOEMS device comprising:
- a fixed optical element connected to the chip;
- a first waveguide connected to the chip, the first waveguide being adapted for receiving light from a light source through a front end and delivering light through a back end; and
- a second waveguide connected to the chip, the second waveguide being adapted for receiving light from the first waveguide through a front end and delivering light through a back end, the second waveguide being adapted for operatively coupling to a photodetector,
- the fixed optical element being disposed between the back end of the first waveguide and the front end of the second waveguide.

* * * * *